(12) United States Patent
Ozawa

(10) Patent No.: US 6,962,320 B2
(45) Date of Patent: Nov. 8, 2005

(54) FLOW CONTROL DEVICE

(75) Inventor: Sigeru Ozawa, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 8 days.

(21) Appl. No.: 10/671,338

(22) Filed: Sep. 25, 2003

(65) Prior Publication Data

US 2004/0113115 A1    Jun. 17, 2004

(30) Foreign Application Priority Data

Dec. 12, 2002  (JP) ............................. 2002-360262

(51) Int. Cl.⁷ ............................................. F16K 31/02
(52) U.S. Cl. ................................. 251/129.11; 251/901
(58) Field of Search ....................... 251/129.11, 129.12, 251/129.13, 337, 901

(56) References Cited

U.S. PATENT DOCUMENTS

| | | | | |
|---|---|---|---|---|
| 737,210 A | * | 8/1903 | Colt ................... | 251/129.12 X |
| 2,989,076 A | * | 6/1961 | Rohmann ............... | 251/901 X |
| 3,726,313 A | * | 4/1973 | Pandya .................... | 251/901 X |
| 4,438,781 A | * | 3/1984 | Brenholt ................. | 251/901 X |
| 5,096,157 A | * | 3/1992 | Yasuda ................... | 251/129.11 |

\* cited by examiner

*Primary Examiner*—Robert M. Fetsuga
(74) *Attorney, Agent, or Firm*—Hogan & Hartson, LLP

(57) ABSTRACT

A flow control device includes a wall part partitioning an upstream side and a downstream side of a flow passage for fluid, an aperture part formed on the wall part, a sheet shaped valve element which changes from a closed state in which the sheet shaped valve element extends along the wall part to cover the aperture part to an opened state in which the aperture part is opened and a valve element drive mechanism for moving the sheet shaped valve element.

14 Claims, 17 Drawing Sheets

[FIG. 1]
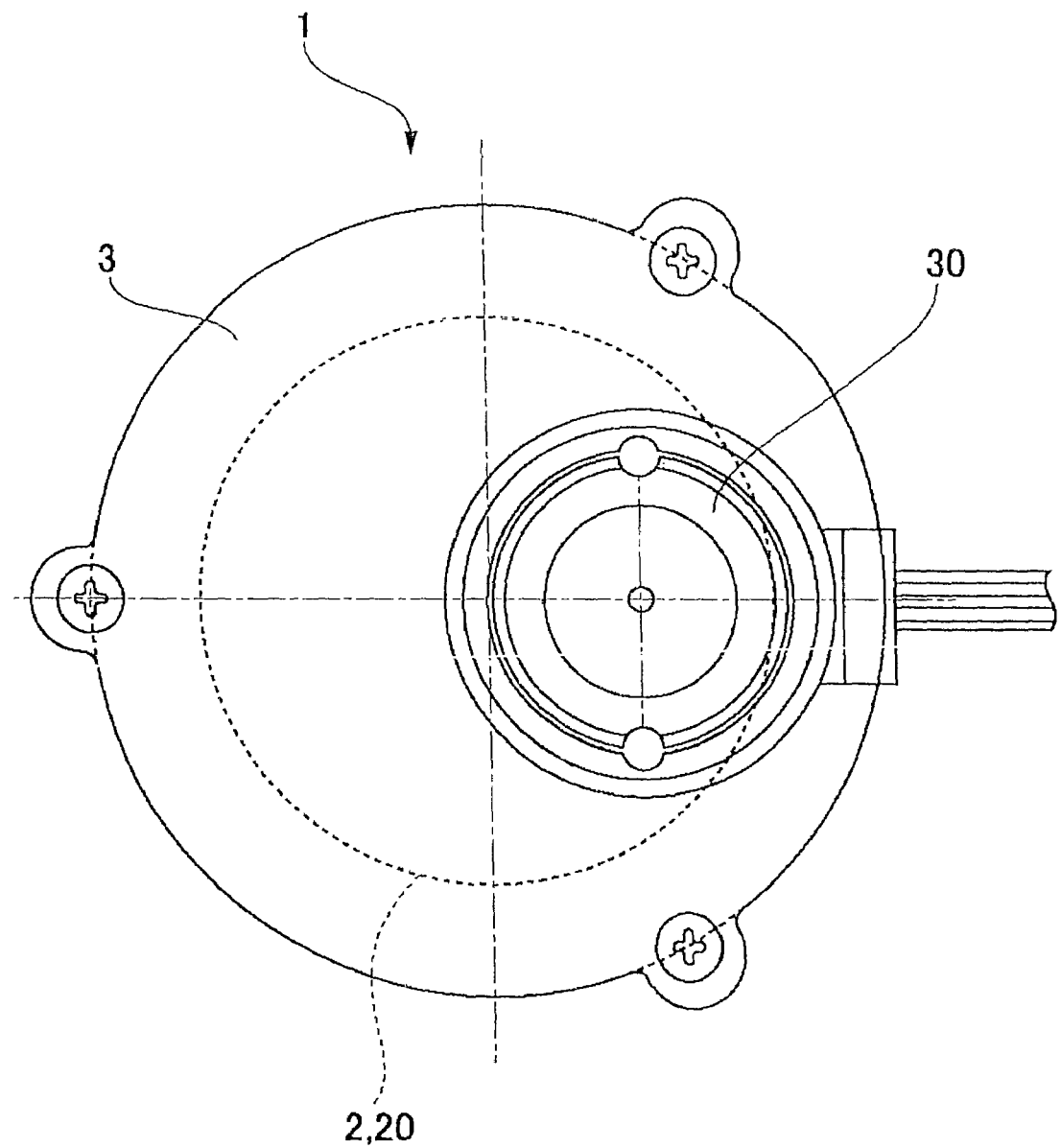

[FIG. 2]
(A)
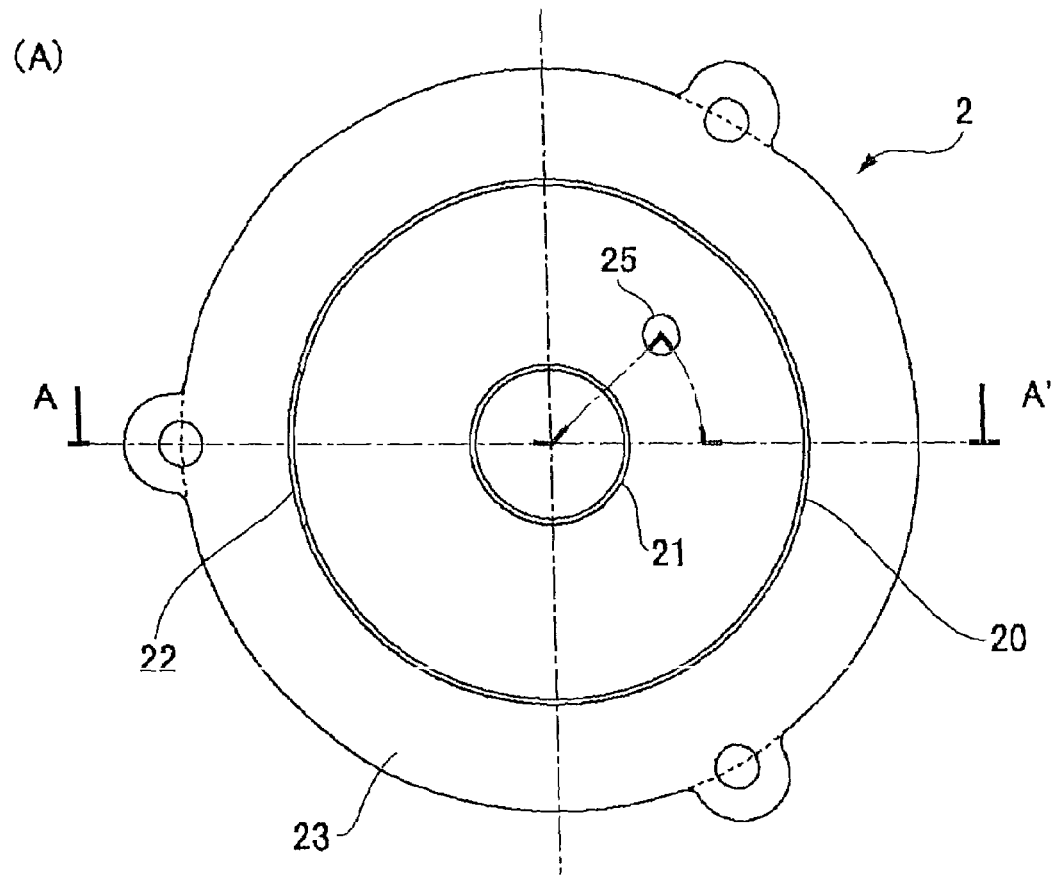
(B)
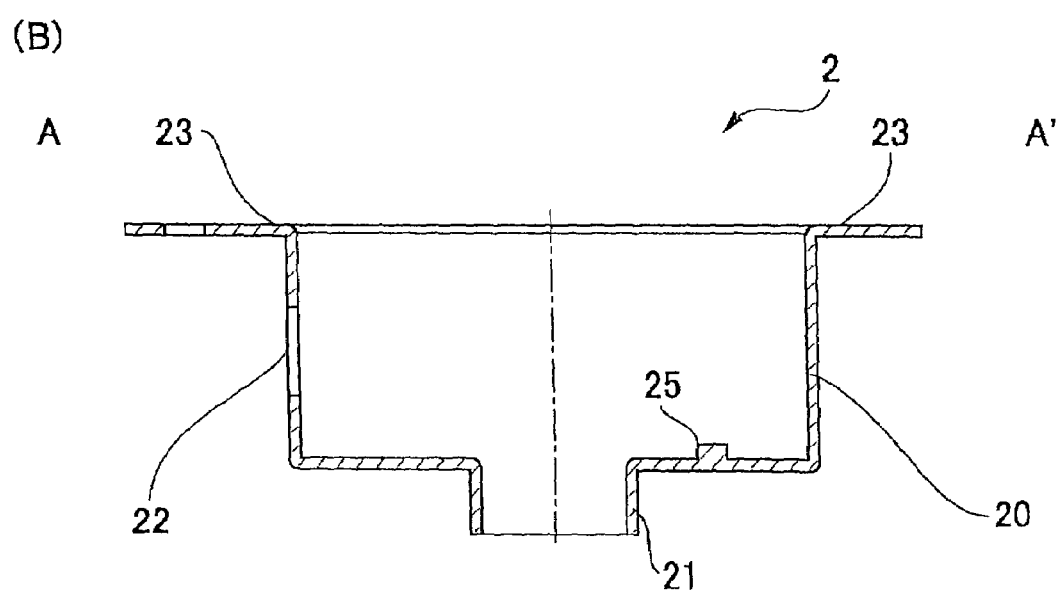

[FIG. 3]
(A)
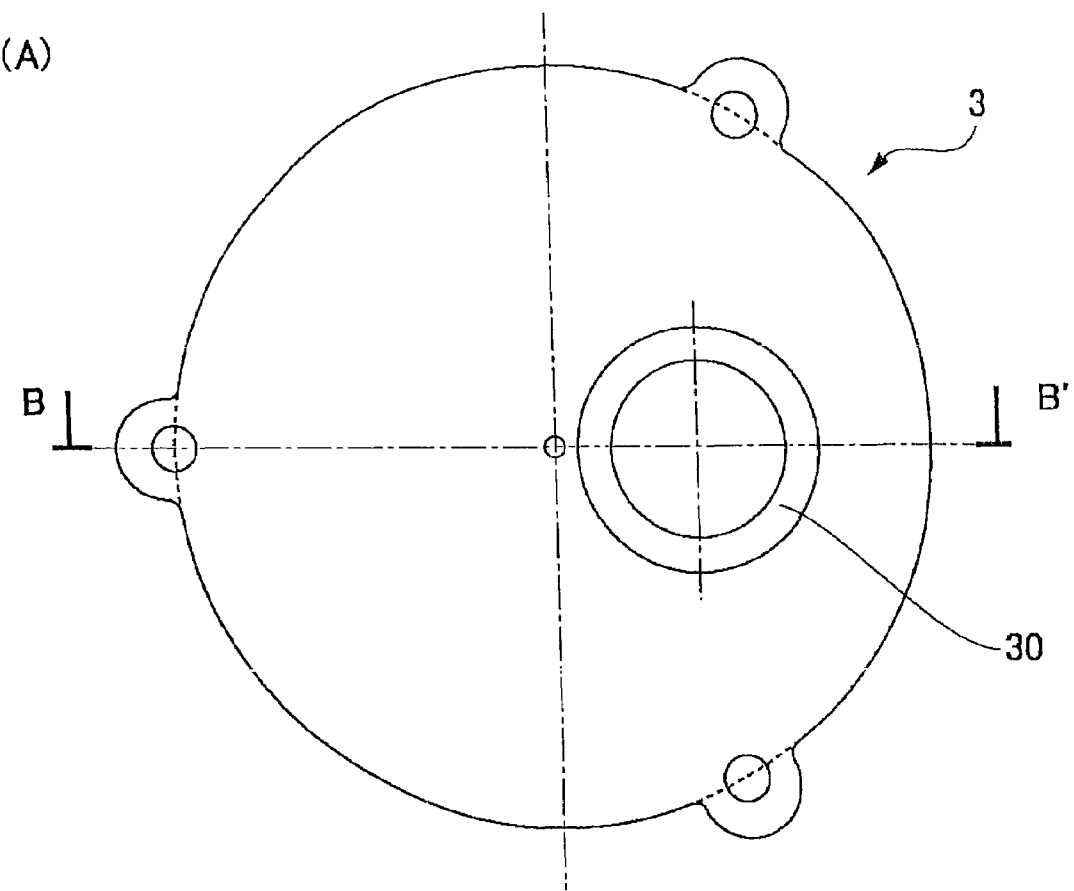
(B)
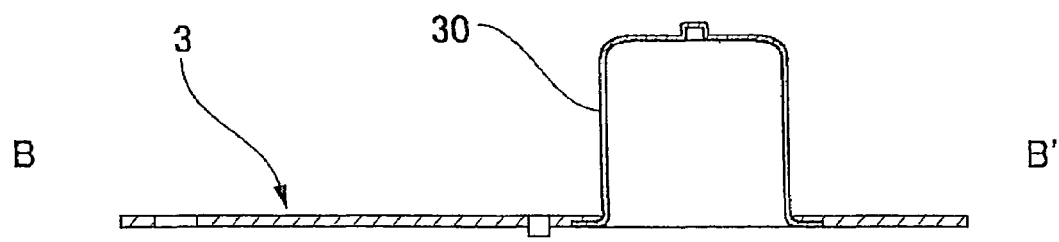

[FIG. 4]
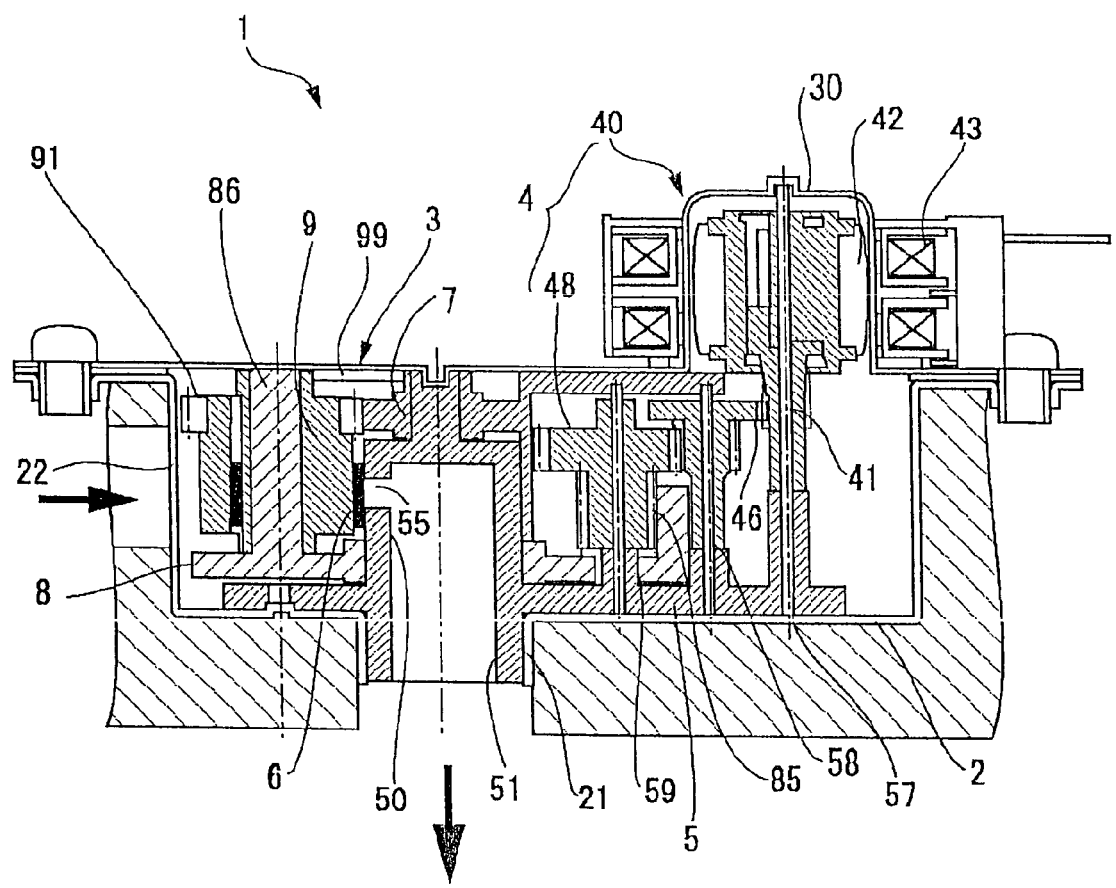

[FIG. 5]
(A)
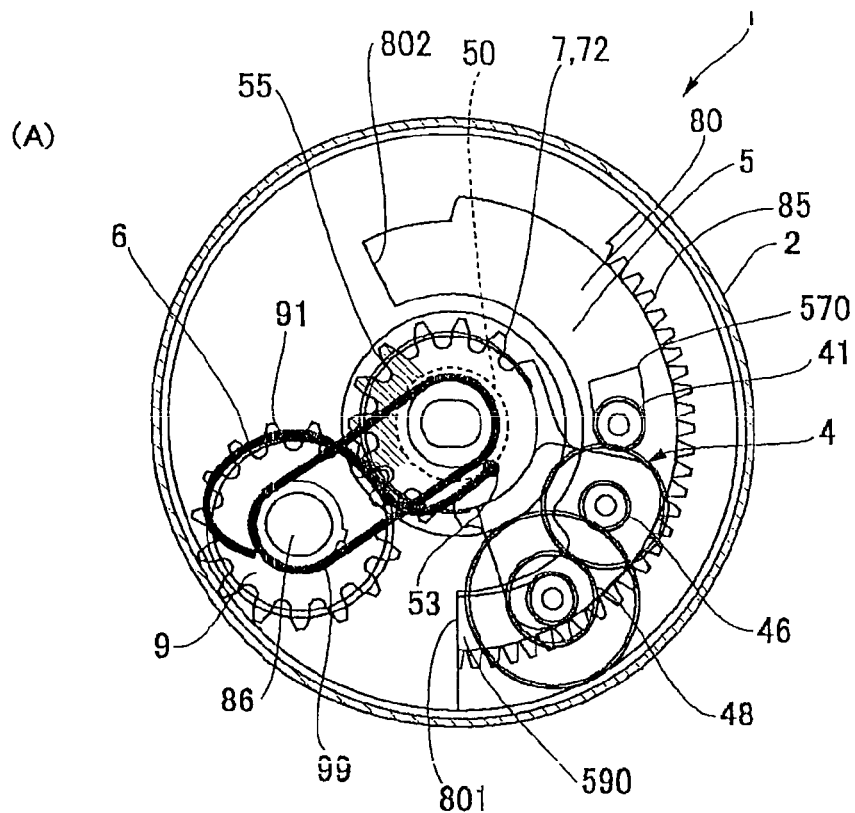
(B)
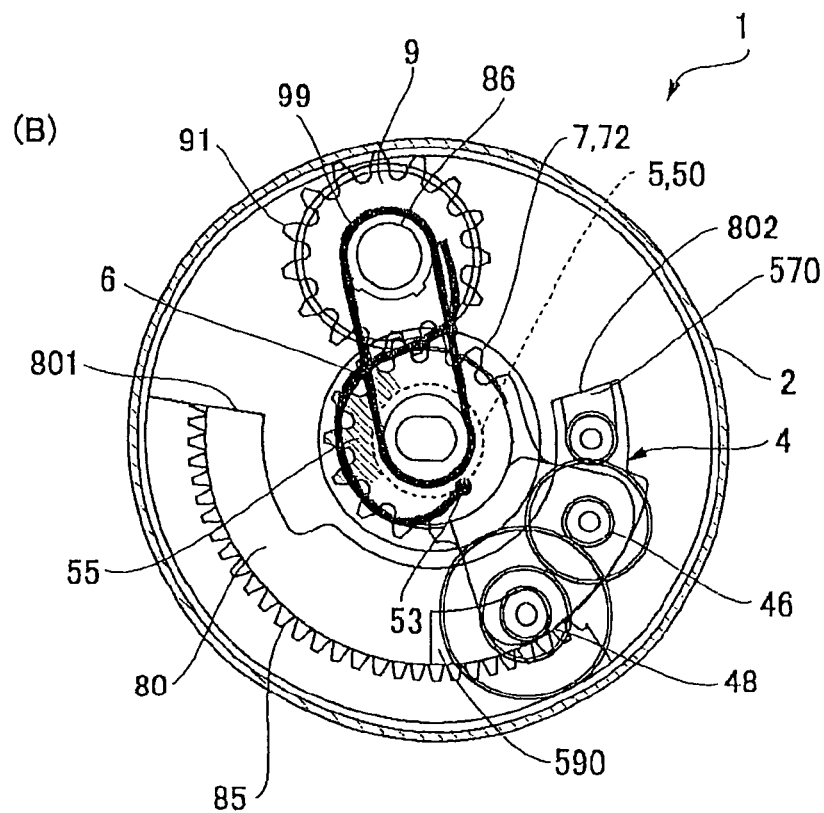

[FIG. 6]
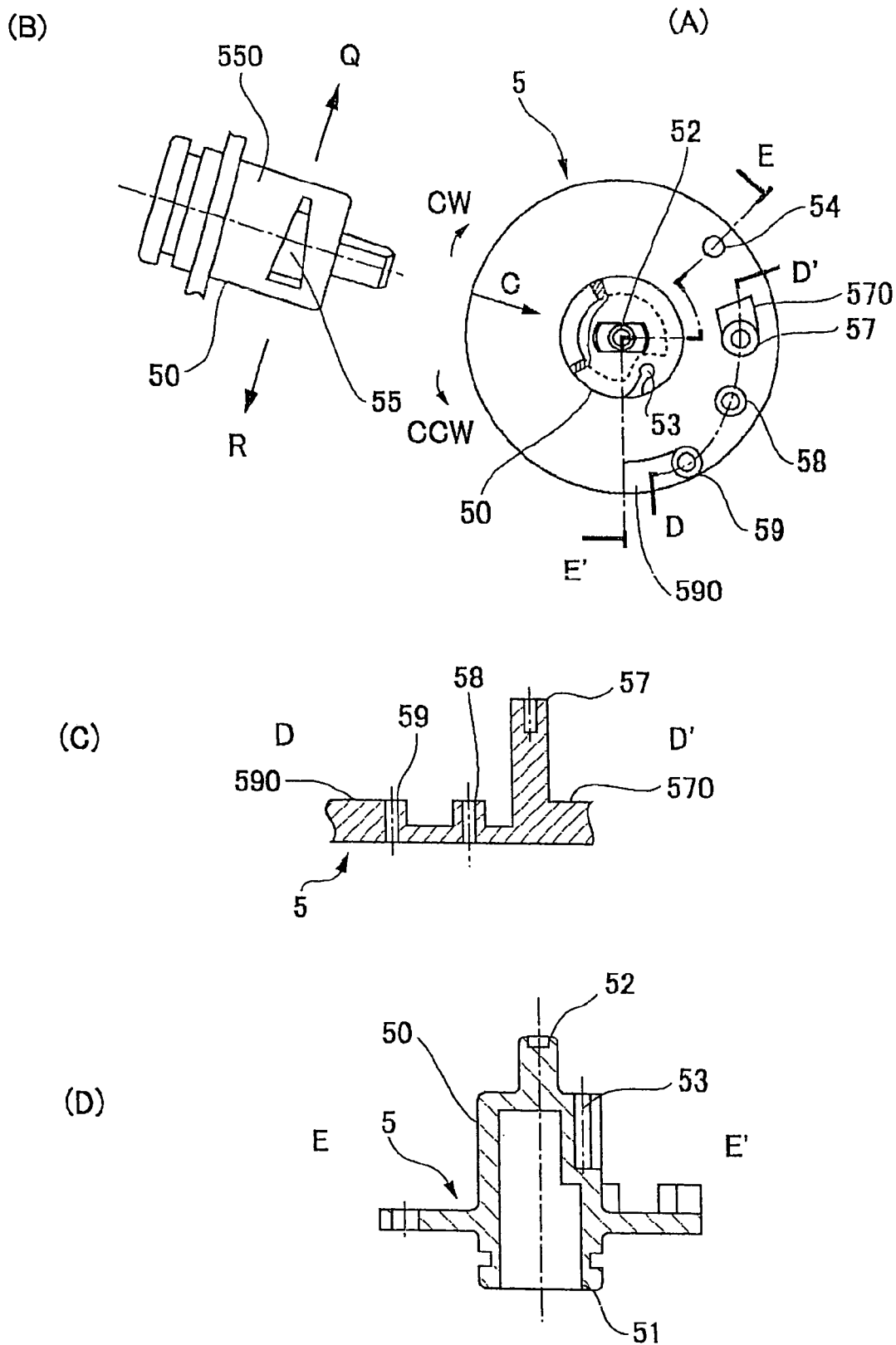

[FIG. 7]
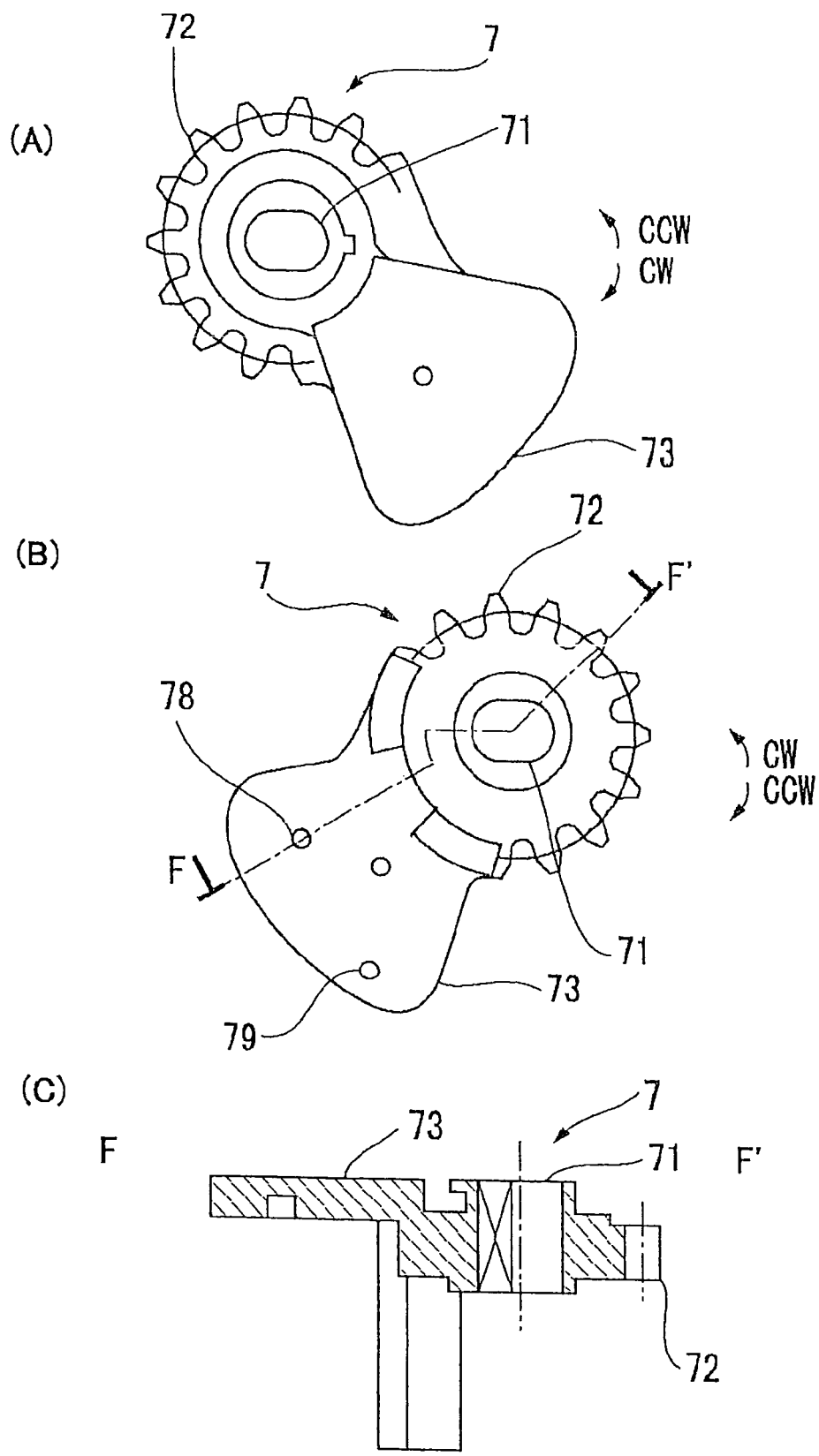

[FIG. 8]
(A)
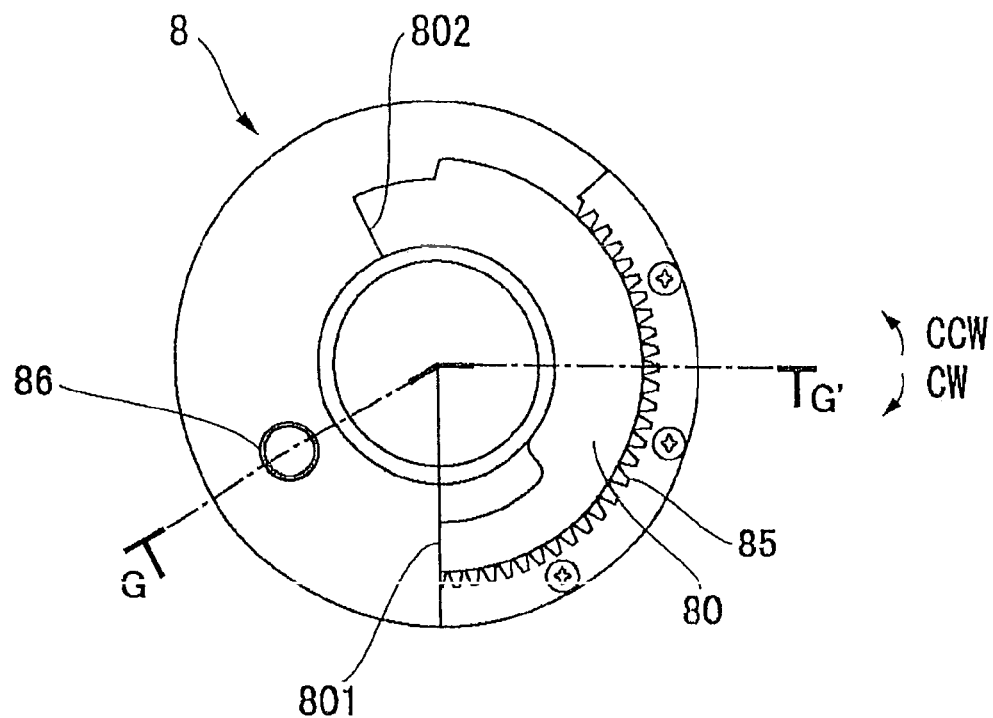
(B)
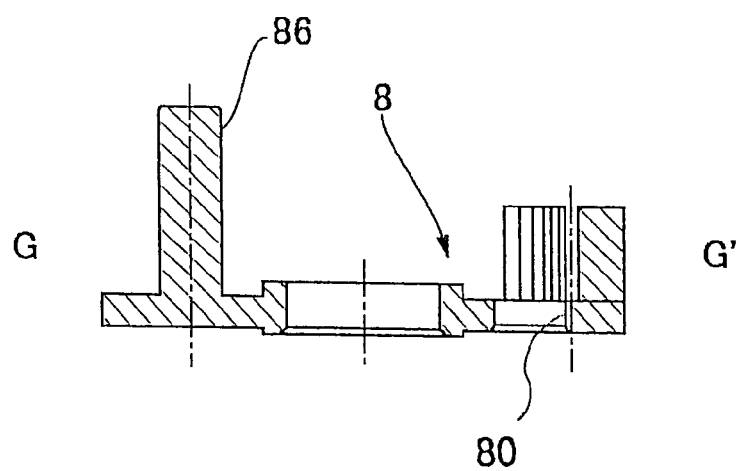

[FIG. 9]
(A)
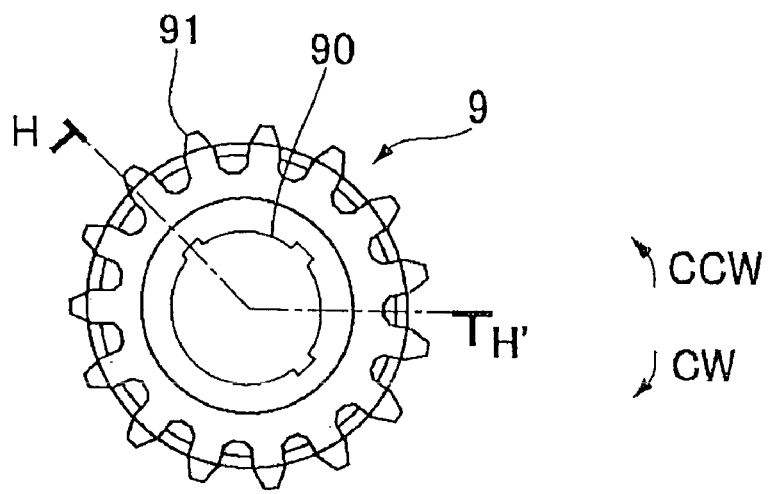
(B)
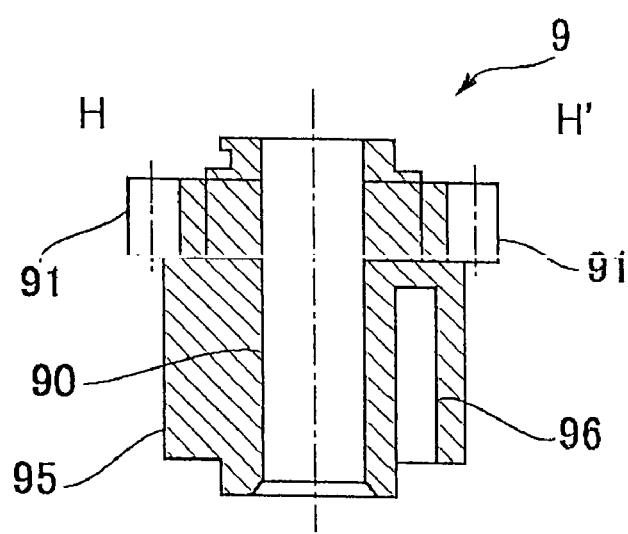
(C)
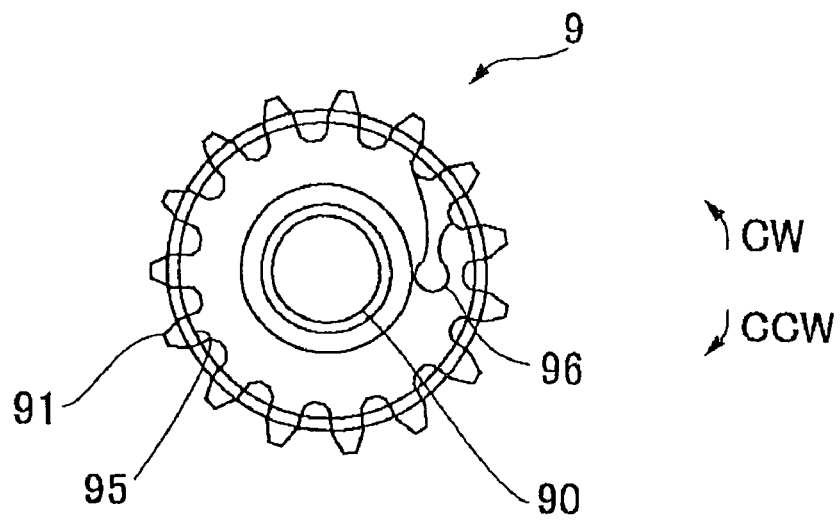

[FIG. 10]
(A)
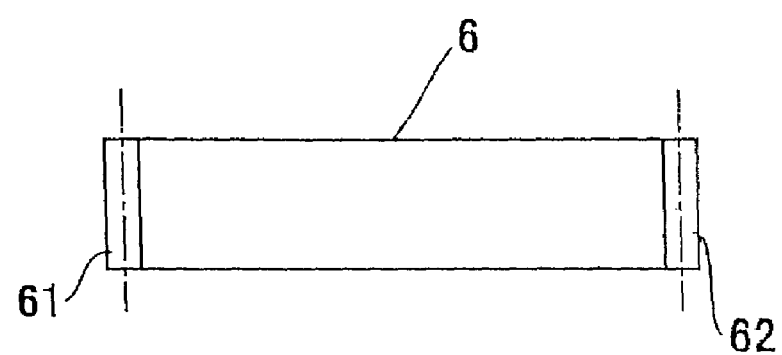
(B)
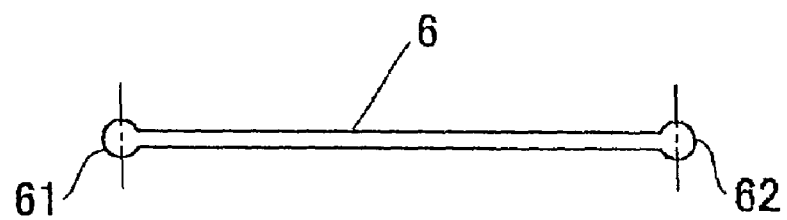

[FIG. 11]
(A)
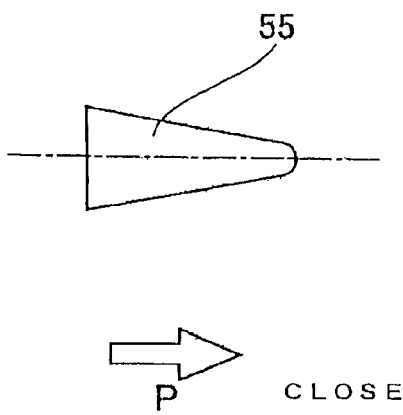
(B)
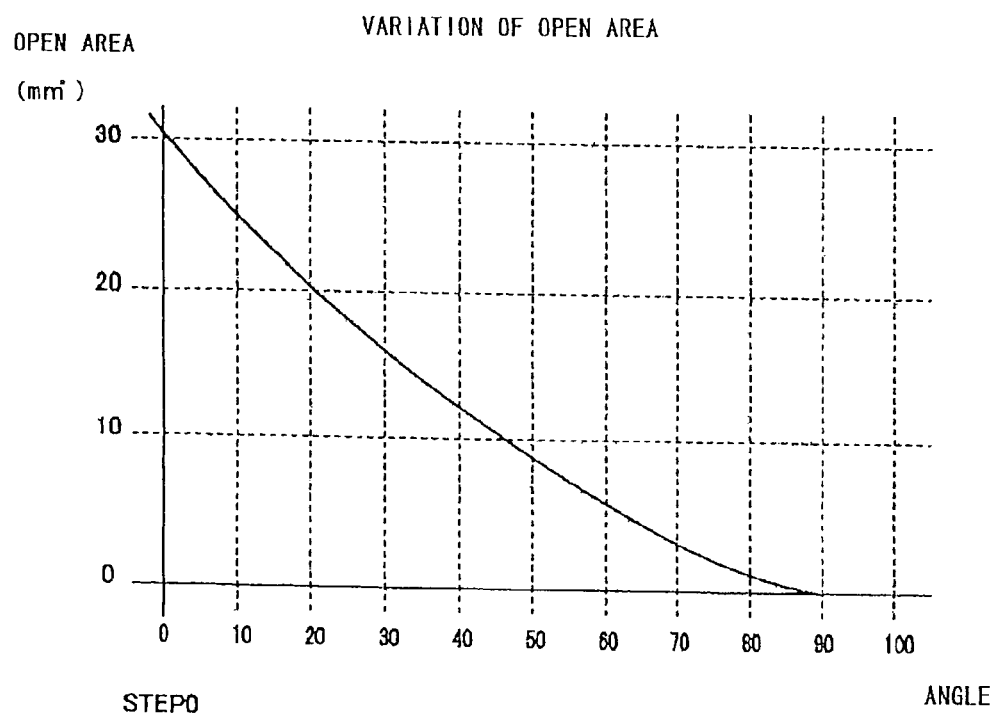

[FIG. 12]
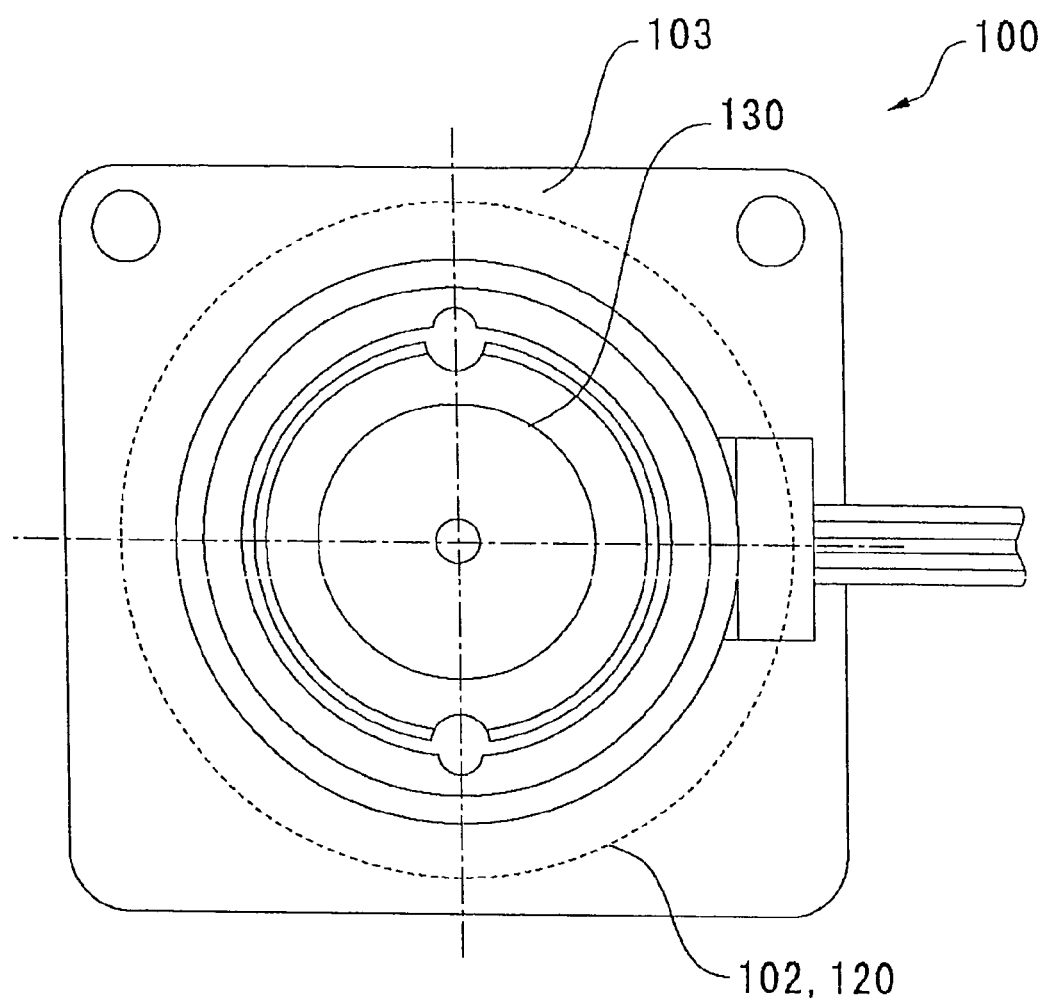

[FIG. 13]
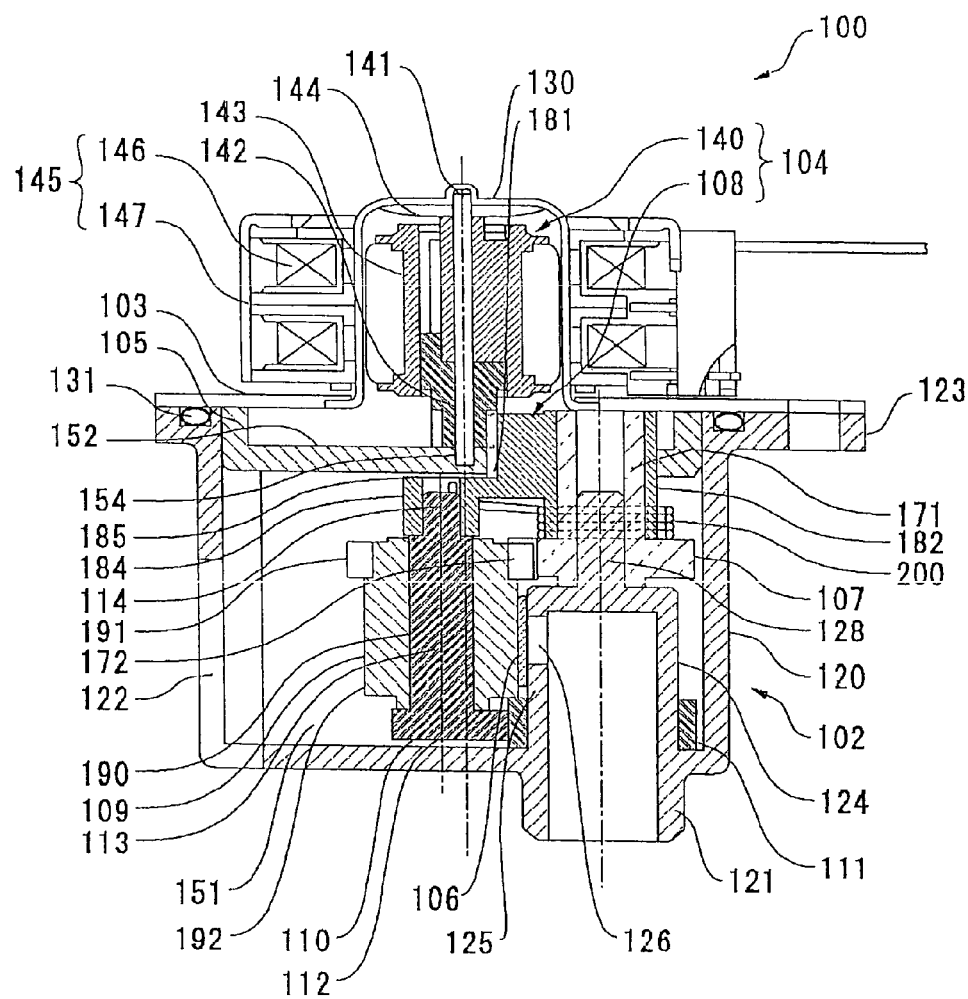

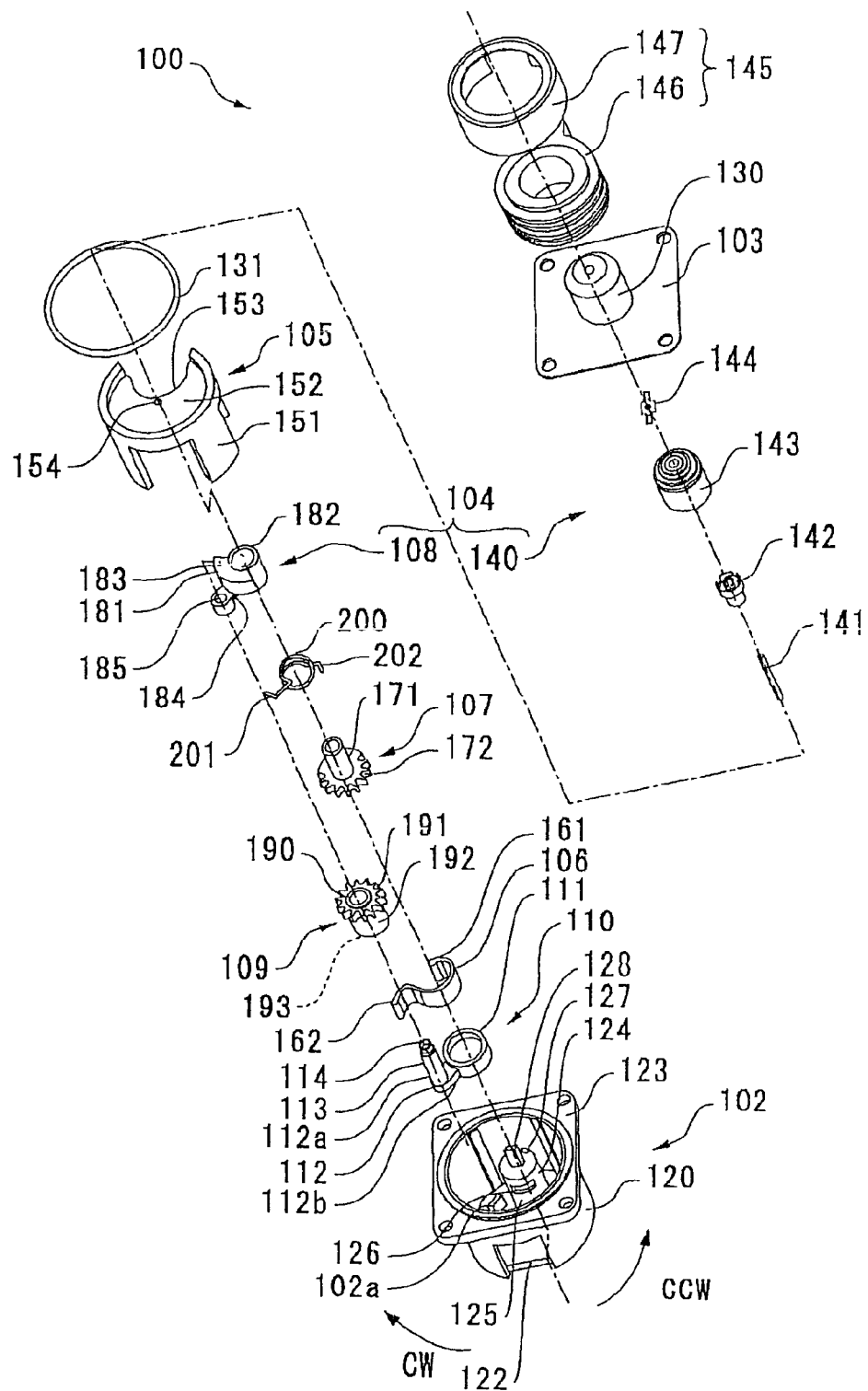
[FIG. 14]

[FIG. 15]
(A)
(B)
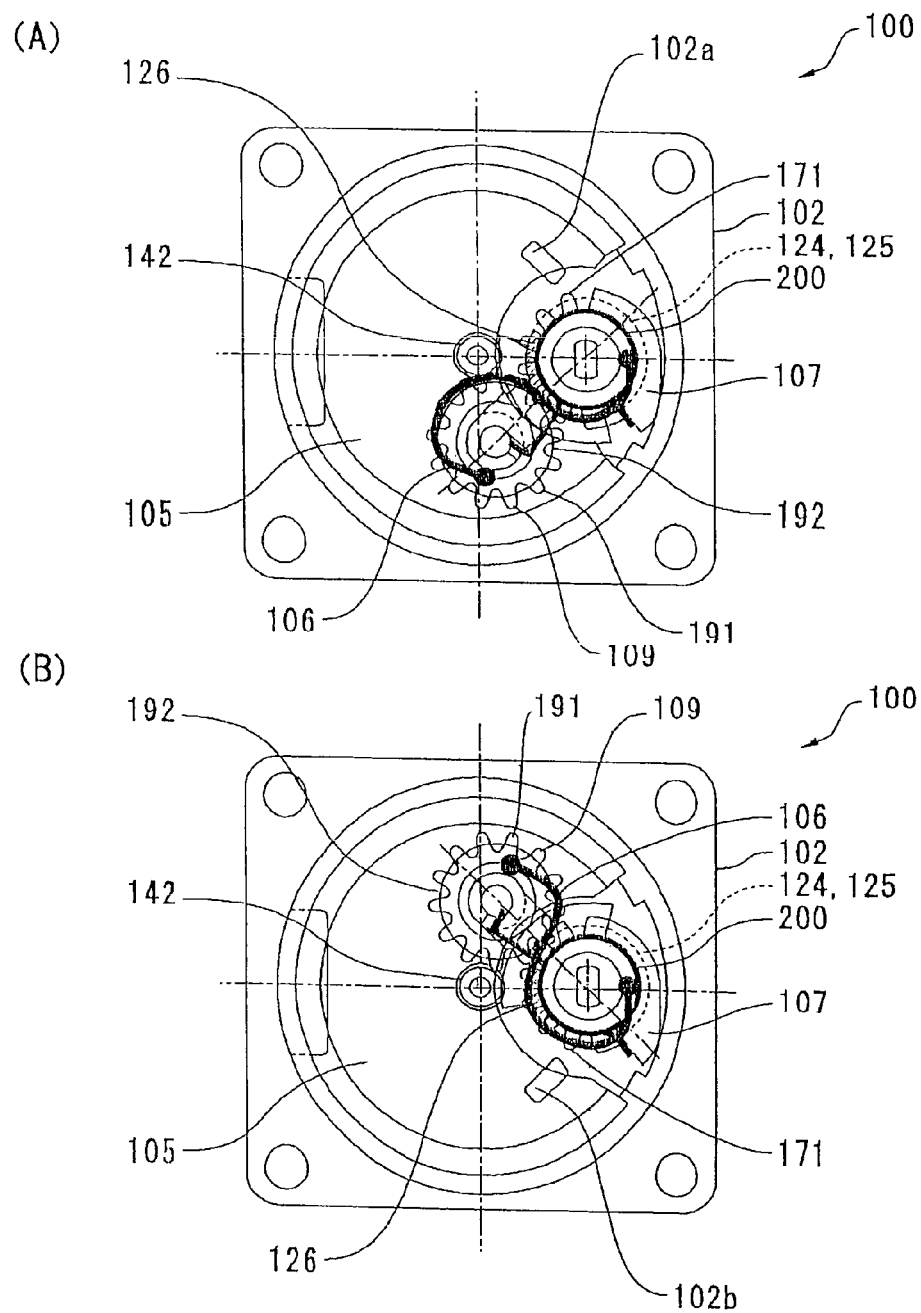

[FIG. 16]
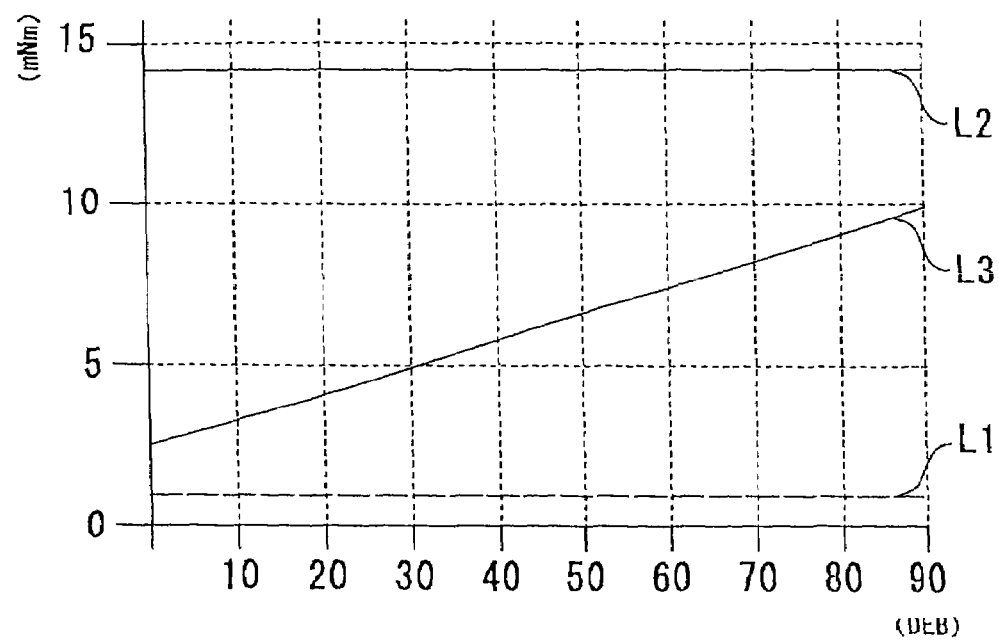

[FIG. 17]
(A)
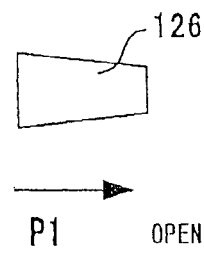
(B)
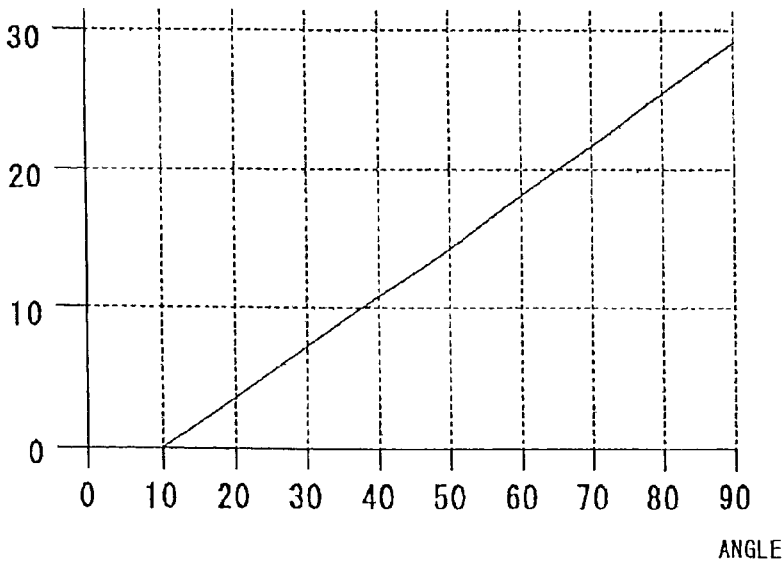

FLOW CONTROL DEVICE

BACKGROUND OF THE INVENTION

1. Field of the Invention

The present invention relates to a flow control device for controlling the flow of various kinds of fluids. Specifically, the present invention relates to a valve mechanism for the flow control device.

2. Description of Related Art

For a valve mechanism used in a flow control device for controlling the flow of LP (liquefied petroleum) gas, town gas, coolant for a refrigerator or an air-conditioner, or liquid, a needle system, a disk system, or a ball system is typically used.

A conventional valve mechanism of a needle system is superior in a linear adjustment function of the flow rate but is liable to be expensive because a high degree of accuracy is required for respective mechanical components to obtain a completely closed state. Further, since a mechanism for converting the rotary motion outputted from a motor into linear-motion is required, the energy conversion efficiency is low and the durability is poor. In addition, since the needle closes like a wedge in the closed state, large energy is required to change from the closed state to the opened state.

A conventional valve mechanism of a disk system is superior in a linear adjustment function of the flow rate and has an advantage that arbitrary flow patterns can be easily realized. However, in order to realize a completely closed state, the flatness with not more than 1 $\mu$m, that is, the degree of the surface roughness nearly equal to a mirror plane is required for the accuracy of facing surfaces, which increases the cost. Further, large energy is required to drive highly accurate surfaces contacting with each other, because an adsorption phenomenon between the contacting surfaces is easy to occur. In addition, in general, the diameter of the aperture, to which the disk system is applied, is limited to a small size, for example, not more than 2$\phi$, i.e., 2 mm in diameter.

A conventional valve mechanism of a ball system can easily realize the completely closed state but is difficult to realize the linear adjustment of the flow rate.

As described above, none of the conventional valve mechanisms is provided with both the linear adjustment of the flow rate and the completely closed function. In order to provide these functions in the conventional valve mechanisms, a precision within the $\mu$ (micron)-order is required in various components, which increases the cost of the overall mechanism. In particular, when the valve mechanism having a larger aperture part is provided with both the linear adjustment function of the flow rate and the completely closed function, the mechanism becomes expensive because the precision for the respective components is required to be further enhanced. Further, power savings and speeding up the control are difficult because driving the valve mechanism is accompanied with loss for converting rotational motion into linear motion and friction loss.

SUMMARY OF THE INVENTION

In view of the problems described above, it is advantage of the present invention to provide a flow control device with a low cost and a constitution capable of attaining power savings; which is capable of being provided with both the linear adjustment of the flow rate and the completely closed function regardless of the size of an aperture part by means of utilizing a new valve mechanism.

In order to achieve the above advantage, according to the present invention, there is provided a flow control device including a wall part partitioning an upstream side and a downstream side of a flow passage for a fluid, an aperture part formed on the wall part, a sheet shaped valve element which changes from a closed state in which the sheet shaped valve element extends along the wall part to cover the aperture part to an opened state in which the aperture part is opened, and a valve element drive mechanism. The valve element drive mechanism may be capable of adjusting an opening degree of the aperture part by the sheet shaped valve element.

In the flow control device in accordance with an embodiment of the present invention, the sheet shaped valve element is extended and developed so as to cover and close the aperture part and also changes to a state in which the aperture part is opened by the sheet shaped valve element. Consequently, the flow pattern can be arbitrarily adjusted by changing the shape of the aperture part, and thus the linear control of the flow rate can be easily attained. Also, the aperture part can be completely covered and closed with the sheet shaped valve element and the sheet shaped valve element is brought into tight contact with the wall face by fluid pressure, and thus the completely closed state can be easily realized. Further, the flow control device has no sliding mechanism of the valve element for operation. Therefore, little wear may occur, high precision is not required for the dimensions of the respective mechanical parts and a high degree of reliability can be obtained.

In the flow control device in accordance with the embodiment of the present invention, the valve element drive mechanism is provided with, for example, a rolling element body that is capable of performing a rolling motion along a wall face on the upstream side of the wall part. The sheet shaped valve element is extended and developed along the wall part to cover the aperture part by the rolling motion of the rolling element body in the closed direction and changes to a state in which the aperture part is opened from the developed and extended state by the rolling motion of the rolling element body in the opened direction. For example, the sheet shaped valve element is extended along the wall part to cover the aperture part by the rolling motion of the rolling element body in the closed direction from a state in which the sheet shaped valve element is wound around the rolling element body and is wound around the rolling element body to open the aperture part by the rolling motion of the rolling element body in the opened direction from the extended state of the sheet shaped valve element. The term "rolling motion" means moving while rotating in this specification of the present invention.

According to the flow control device having such a constitution, the sheet shaped valve element can extend along the wall part to cover the aperture part by the rolling motion of the rolling element body in the closed direction and the aperture part can be opened by the rolling motion of the rolling element body in the opened direction from the extended state of the sheet shaped valve element. Accordingly, the opening degree of the aperture part can be adjusted by the sheet shaped valve element in accordance with the position of the rolling element body. Consequently, an arbitrary flow pattern can be realized by means of changing the shape of the aperture part, and thus the linear control of the flow rate can be easily attained. Also, when the rolling element body performs a rolling motion in the completely closed direction, the aperture part can be completely covered and closed with the sheet shaped valve element and the sheet shaped valve element is brought into tight contact with the wall face by the fluid pressure. Therefore, the completely closed state can be easily realized. Further, the flow control device has no sliding mechanism of the valve element for operation. Therefore, little wear may occur, high precision is not required for the dimensions of mechanical parts and thus a high degree of reliability can be obtained. In addition, in this embodiment, since the rotational motion is employed to perform the rolling motion of the rolling element body, the rotational motion outputted from a motor is only transmitted to the rolling element body. Therefore, the rotational motion is not required to be converted into linear motion and thus energy loss is little because friction loss is reduced.

Preferably, in accordance with an embodiment of the present invention, the aperture part is formed in a shape extended in the rolling direction of the rolling element body. According to the embodiment constituted above, the opening degree of the aperture part, i.e., the flow rate can be controlled with a high degree of precision.

Preferably, in accordance with an embodiment of the present invention, the aperture part is formed in such a manner that the aperture widths are different on one side than the other side with respect to the rolling direction of the rolling element body. Concretely, the aperture part is preferably formed in such a manner that the aperture width is narrow on one side and wide on the other side. For example, when the aperture width is set to be narrow on a smaller amount of the flow rate side and wide on a larger flow rate side, the flow rate on the smaller amount of the flow rate side can be controlled with a high degree of precision. On the contrary, when a high degree of precision is required on the larger flow rate side, the aperture width is set to be wide on the smaller flow rate side and narrow on the larger flow rate side.

Preferably, in accordance with an embodiment of the present invention, the wall part is, for example, a cylindrical wall part whose inner side is constituted to be on the downstream side and the rolling element body is constituted so as to perform a planet motion along an outer wall face of the cylindrical wall part. According to the embodiment utilizing such a planet motion, the mechanism for the rolling motion along the wall face of the rolling element body can be simplified. Also, even though the aperture part is formed to be extended in the rolling direction of the rolling element body, the valve mechanism can be constituted within a narrow space.

In the case as constituted above, the valve element drive mechanism may be provided with a movable body capable of rotating about the cylindrical wall part while the rolling element body is rotatably supported. The movable body may be constituted so as to be rotated about the cylindrical wall part to move the rolling element body along the outer wall face of the cylindrical wall part. According to the embodiment as constituted above, the rolling element body can revolve by transmitting the rotational motion outputted from the motor to the rolling element body with a simple constitution. In this case, preferably, the movable body is, for example, a ring-shaped sprocket provided with internal teeth and the valve element drive mechanism is constituted in such a manner that the internal teeth of the ring-shaped sprocket are engaged with a power transmission gear on the drive source side. According to the embodiment as constituted above, the entire or most of the mechanism can be disposed in the inner side of the ring-shaped sprocket, and thus the flow control device can be constituted within a narrow space.

Preferably, in accordance with an embodiment of the present invention, outer teeth are formed on the rolling element body and outer teeth which are engaged with the outer teeth for rotating the rolling element body are formed on the wall face side. According to the embodiment as constituted above, the rolling element body can be rotated with a simple constitution.

Preferably, in accordance with an embodiment of the present invention, an urging member for urging the rolling element body toward the wall face is provided. According to the embodiment as constituted above, the revolution and the rotation of the rolling element body can be interlocked surely and the sheet shaped valve element can be brought into tight contact with the wall face.

Preferably, in accordance with an embodiment of the present invention, the flow control device is provided with a home position reset mechanism for returning the sheet shaped valve element toward the home position where the aperture part is completely opened or toward the home position where the aperture part is completely closed when the energization for a motor as a drive source of the valve element drive mechanism stops. The valve element drive mechanism drives the sheet shaped valve element from the home position in a specified direction against the force which the home position reset mechanism exerts on the sheet shaped valve element. As constituted above, when the energization for the motor as the drive source of the valve element drive mechanism stops, the sheet shaped valve element is automatically returned to the home position. Therefore, for example, gas supplied downstream can be rapidly stopped. Consequently, the stopping of the fluid required at the time of an abnormality can be realized with a simple constitution without using an expensive shut-off valve such as a solenoid valve.

In the case constituted above, it is preferable to set a gap between the field magnetic pole and the magnet of the motor to be not less than 0.2 mm. Also, it is preferable to set the reduction gear ratio in the valve element drive mechanism to be not more than $\frac{1}{10}$. As constituted above, the home position reset mechanism can easily overcome the detent torque of the motor to return the sheet shaped valve element to the home position surely.

Preferably, in accordance with an embodiment of the present invention, the sheet shaped valve element is an elastic sheet. As constituted above, the sheet shaped valve element can be brought into tight contact with the wall face by its own elasticity.

The flow control device in accordance with an embodiment of the present invention may be used to control the flow of either gas or liquid. Particularly it is more effective when it is used for flow control of gas, which is difficult in the conventional system.

Other features and advantages of the invention will be apparent from the following detailed description, taken in conjunction with the accompanying drawings that illustrate, by way of example, various features of embodiments of the invention.

BRIEF DESCRIPTION OF DRAWINGS

FIG. 1 is a plan view of a flow control device in accordance with a first embodiment of the present invention.

FIG. 2(A) is a plan view of a lower case of the flow control device in accordance with the first embodiment of the present invention and FIG. 2(B) is the A–A' cross-sectional view in FIG. 2(A).

FIG. 3(A) is a plan view of an upper case of the flow control device in accordance with the first embodiment of the present invention and FIG. 3(B) is the B–B' cross-sectional view in FIG. 3(A).

FIG. 4 is a developed view of respective constitutional elements that are assembled into the flow control device in accordance with the first embodiment of the present invention.

FIG. 5(A) is a plan view showing an open state in the flow control device in accordance with the first embodiment of the present invention and FIG. 5(B) is a plan view showing a close state.

FIG. 6(A) is a plan view of a drum body used in the flow control device in accordance with the first embodiment of the present invention. FIG. 6(B) is a side view of a cylindrical wall part in which an aperture part is formed in the drum body, which is viewed from the direction of the arrow C shown in FIG. 6(A). FIG. 6(C) is the D–D' cross-sectional view of the drum body in FIG. 6(A), and FIG. 6(D) is the E–E' cross-sectional view of the drum body in FIG. 6(A).

FIG. 7(A) is a plan view of a gear body used in the flow control device in accordance with the first embodiment of the present invention, FIG. 7(B) is a bottom view of the gear body and FIG. 7(C) is the F–F' cross-sectional view of the gear body in FIG. 7(B).

FIG. 8(A) is a plan view of a ring-shaped sprocket used in the flow control device in accordance with the first embodiment of the present invention and FIG. 8(B) is the G–G' cross-sectional view of the ring-shaped sprocket in FIG. 8(A).

FIG. 9(A) is a plan view of a rolling element body used in the flow control device in accordance with the first embodiment of the present invention, FIG. 9(B) is the H–H' cross-sectional view of the rolling element body in FIG. 9(A), and FIG. 9(C) is a bottom view of the rolling element body.

FIG. 10(A) is a side view of a sheet shaped valve element used in the flow control device in accordance with the first embodiment of the present invention and FIG. 10(B) is a plan view of the sheet shaped valve element.

FIG. 11(A) is an explanatory view of an aperture part used in the flow control device 1 in accordance with the first embodiment of the present invention and FIG. 11(B) is a graph showing a relationship between an angular position of the rolling element body to the aperture part and an open area of the aperture part.

FIG. 12 is a plan view of a flow control device in accordance with a second embodiment of the present invention.

FIG. 13 is a developed view of respective constitutional elements that are assembled into the flow control device in accordance with the second embodiment of the present invention.

FIG. 14 is an exploded perspective view showing the flow control device in accordance with the second embodiment of the present invention.

FIG. 15(A) is a plan view showing an open state in the flow control device in accordance with the second embodiment of the present invention and FIG. 15(B) is a plan view showing a close state in the flow control device.

FIG. 16 is an explanatory view showing a relationship between the magnitudes of detent torque and output torque of a motor and torque of a return spring in the flow control device in accordance with the second embodiment of the present invention.

FIG. 17(A) is an explanatory view of an aperture part used in the flow control device in accordance with the second embodiment of the present invention and FIG. 11(B) is a graph showing a relationship between an angular position of the rolling element body to the aperture part and an open area of the aperture part.

DETAILED DESCRIPTION OF THE PREFERRED EMBODIMENTS

Flow control devices in accordance with embodiments of the present invention will be described below with reference to the accompanying drawings.

Embodiment 1

(Appearance and Constitution of Valve Element Drive Mechanism)

FIG. 1 is a plan view of a flow control device to which the present invention is applied. FIG. 2(A) is a plan view of a lower case of the flow control device to which the present invention is applied and FIG. 2(B) is the A–A' cross-sectional view in FIG. 2(A). FIG. 3(A) is a plan view of an upper case of the flow control device to which the present invention is applied and FIG. 3(B) is the B–B' cross-sectional view in FIG. 3(A). FIG. 4 is a developed view of respective constitutional elements that are assembled into the flow control device to which the present invention is applied.

In FIG. 1, the flow control device 1 to which the present invention is applied is used to control the flow of LP (liquefied petroleum) gas, town gas, coolant for a refrigerator or an air-conditioner or the like and is formed in a circular and planar shape as a whole.

The flow control device 1 is provided with a lower case 2, which includes a cylindrical recessed part 20 having a cylindrical fluid outlet part 21 at its bottom portion, a fluid inlet part 22 formed at a peripheral wall of the recessed part 20, and a flange part 23 extended toward the outer periphery from an upper end of the recessed part 20 as shown in FIGS. 2(A) and 2(B). An upper case 3 shown in FIGS. 3(A) and 3(B) is covered on the lower case 2, and the outer periphery side of the upper case 3 and the flange part 23 of the lower case 2 are fixed together by screws or the like. A cylindrical part 30, within which a rotor section of a stepping motor 40 is disposed, is protruded from the upper case 3 as shown in FIG. 4.

In this embodiment, the valve element driving mechanism 4 of the flow control device 1 includes a stepping motor 40, a first power transmission gear 46 which is meshed with outer teeth fixed on an output shaft 41 of the stepping motor 40, and a second power transmission gear 48 meshed with the first power transmission gear 46. The rotor 42 etc. of the stepping motor 40 is arranged within the cylindrical part 30 of the upper case 3 and a stator 43 of the stepping motor 40 is arranged on the outer peripheral face of the cylindrical part 30.

(Constitution of Valve Mechanism)

FIG. 5(A) is a plan view showing an opened state in the flow control device to which the present invention is applied and FIG. 5(B) is a plan view showing a closed state in the flow control device. FIG. 6(A) is a plan view of a drum body used in the flow control device to which the present invention is applied, FIG. 6(B) is a side view of a cylindrical wall part in which an aperture part is formed in the drum body, which is viewed from the direction of the arrow C shown in FIG. 6(A), FIG. 6(C) is the D–D' cross-sectional view of the drum body in FIG. 6(A), and FIG. 6(D) is the E–E' cross-sectional view of the drum body in FIG. 6(A). FIG. 7(A) is a plan view of a gear body used in the flow control device to which the present invention is applied, FIG. 7(B) is a bottom view of the gear body and FIG. 7(C) is the F–F' cross-sectional view of the gear body in FIG. 7(B). FIG. 8(A) is a plan view of a ring-shaped sprocket used in the flow control device to which the present invention is applied and FIG. 8(B) is the G–G' cross-sectional view of the ring-shaped sprocket in FIG. 8(A). FIG. 9(A) is a plan view of a rolling element body used in the flow control device to which the present invention is applied, FIG. 9(B) is the H–H' cross-sectional view of the rolling element body in FIG. 9(A), and FIG. 9(C) is a bottom view of the rolling element body. FIG. 10(A) is a side view of a sheet shaped valve element used in the flow control device to which the present invention is applied and FIG. 10(B) is a plan view of the sheet shaped valve element.

As shown in FIG. 4 and FIG. 5(A), a drum body 5 shown in FIGS. 6(A), 6(B), 6(C) and 6(D) is arranged at a center position of the recessed part 20 of the lower case 2 covered with the upper case 3 in the flow control device 1 to which the present invention is applied.

The outer peripheral portion of the drum body 5 is formed in a disk-like shape, and has a cylindrical wall part 50 at the central portion and a cylindrical outlet part 51 which is a substantial fluid outlet protruded downward. An aperture part 55 formed extended in a peripheral direction is opened on an outer wall face 550 of the cylindrical wall part 50. The aperture part 55 is in communication with the cylindrical outlet part 51 through the inside of the cylindrical wall part 50.

In this embodiment, the aperture part 55 is formed in a trapezoid shape, in which an opened width becomes narrower in a closed direction (direction shown by the arrow Q) by a sheet shaped valve element 6 described below, that is, on a little flow rate side, and an opened width becomes wider in an opened direction (direction shown by the arrow R), that is, on a large flow rate side.

A groove 53, into which one end portion of the sheet shaped valve element 6 is inserted and fixed, is formed so as to extend downward from an upper face side on a side face of the cylindrical wall part 50.

The drum body 5 having such a constitution is arranged at a bottom portion of the recessed part 20 of the lower case 2 in such a manner that the cylindrical outlet part 51 is fitted into cylindrical fluid outlet part 21 of the lower case 2. Further, a protruding part 25 (see FIGS. 2(A) and 2(B)) of the lower case 2 is fitted into a through-hole 54 of the drum body 5 and the drum body 5 is fixed to the lower case 2.

Three cylindrical bearing parts 57, 58 and 59 are formed around the cylindrical wall part 50 in a peripheral direction on an upper face of the drum body 5. The bearing part 57 supports the tip end of the output shaft 41 of the stepping motor 40 rotatably. The opposite side portions of the bearing parts 57 and 59 with respect to the bearing part 58 are formed thicker toward the outside in a peripheral direction so as to form step portions 570 and 590. The respective step portions 570 and 590 serve as a stopper for controlling a movable range of the ring-shaped sprocket 8 by abutting against an inner edge of a window 80 of the ring-shaped sprocket 8, which will be described below with reference to FIG. 8.

An upper portion of the cylindrical wall part 50 of the drum body 5 is formed in a closed state, and a protruding part 52 for mounting a gear body 7 is formed upward on the upper face of the cylindrical wall part 50 as shown in FIGS. 7(A), 7(B) and 7(C).

The gear body 7 is provided with a fixed part 71 fixed to the upper part of the cylindrical wall part 50 of the drum body 5, an outer teeth 72 formed on the outer side of the fixed part 71, and an extended plate part 73 extended in a sector shape on an outer peripheral side from the fixed part 71. The extended plate part 73 is arranged so as to be opposed to the portion in which the bearing parts 58 and 59 of the drum body 5 are formed when the gear body 7 is fixed to the upper part of the cylindrical wall part 50 of the drum body 5. Two bearing holes 78 and 79 are formed on a lower face of the extended plate part 73 at opposing positions to the bearing parts 58 and 59 of the drum body 5. A rotary shaft of the first power transmission gear 46 is rotatably supported by the bearing hole 78 and the bearing part 58, and a rotary shaft of the second power transmission gear 48 is rotatably supported by the bearing hole 79 and the bearing part 59.

In FIG. 4 and FIG. 5(A), the ring-shaped sprocket 8 (movable body) shown in FIGS. 8(A) and 8(B) is disposed on the upper side of the drum body 5 within the recessed part 20 of the lower case 2. The ring-shaped sprocket 8 is rotatably supported about the cylindrical wall part 50 on the drum body 5. The ring-shaped sprocket 8 is provided with a window part 80, which is capable of accommodating a region including a portion where the cylindrical bearing parts 57, 58 and 59 are formed for supporting the output shaft 41 of the stepping motor 40, the first power transmission gear 46, and the second power transmission gear 48. An inner edge part 801 of the window part 80 in a clockwise direction CW abuts against the step portion 590 of the drum body 5 to restrict further rotation of the ring-shaped sprocket 8 when the ring-shaped sprocket 8 rotates in the counter clockwise direction CCW. Also, an inner edge part 802 in the counter clockwise direction CCW abuts against the step portion 570 of the drum body 5 to restrict further rotation of the ring-shaped sprocket 8 when the ring-shaped sprocket 8 is rotated in the clockwise direction CW.

Internal teeth 85 are formed on an inner peripheral edge of the window 80 of the ring-shaped sprocket 8 and the internal teeth 85 are engaged with the second power transmission gear 48.

A rotation center shaft 86 is formed on the ring-shaped sprocket 8 near the aperture part 55 which is formed on the cylindrical wall part 50 of the drum body 5. A rolling element body 9 shown in FIGS. 9(A), 9(B) and 9(C) is rotatably attached to the rotation center shaft 86.

The rolling element body 9 is a cylindrical body which has a shaft hole 90 into which the rotation center shaft 86 of the ring-shaped sprocket 8 is inserted and has outer teeth 91 formed on an outer peripheral face on its upper end side. The outer teeth 91 of the rolling element body 9 are engaged with the outer teeth 72 of the gear body 7 while the rolling element body 9 is arranged within the recessed part 20 of the lower case 2 together with the ring-shaped sprocket 8. Also, in this state, a rubber ring 99 is disposed in an extended state between an upper end portion of the rolling element body 9 and an upper end portion of the cylindrical wall part 50 for energizing the rolling element body 9 toward the cylindrical wall part 50.

Also, the rolling element body 9 includes a trunk portion 95 at a portion on the lower side of the outer teeth 91, around which the sheet shaped valve element 6 shown in FIGS. 10(A) and 10(B) is wound. A deep groove 96, into which one end part of the sheet shaped valve element 6 is inserted and fixed, is opened on a lower face of the body portion 95.

In FIGS. 10(A) and 10(B), the sheet shaped valve element 6 is made of rubber and formed in a band shape. On both end portions of the sheet shaped valve element 6 are formed a first round bar-shaped connecting part 61 which is inserted and fixed to the groove 53 formed on the side face of the cylindrical wall part 50 and a second round bar-shaped connecting part 62 which is inserted and fixed to the groove 96 formed on the rolling element body 9.

The sheet shaped valve element 6 is wound around the body portion 95 of the rolling element body 9 in an opened state of the aperture part 55 as shown in FIG. 5 (A). In order to be in a closed state of the aperture part 55, the sheet shaped valve element 6 is unwound and extended along the outer wall face 550 of the cylindrical wall part 50 in accordance with the rolling motion of the rolling element body 9 in the clockwise direction CW as shown in FIG. 5(B) to cover and close the aperture part 55.

(Operation and Effect)

FIG. 11(A) is an explanatory view of the aperture part used in the flow control device 1 in which the present invention is applied and FIG. 11(B) is a graph showing a relationship between an angular position of the rolling element body with respect to the aperture part and an opened area of the aperture part.

In the flow control device 1 according to the present embodiment, when the sheet shaped valve element 6 is wound around the body portion 95 of the rolling element body 9 in the state that the rolling element body 9 is moves in the counter clockwise direction CCW as shown in FIG. 4 and FIG. 5(A), the aperture part 55 formed on the cylindrical wall part 50 is in a completely opened state. Accordingly, the counter clockwise direction CCW in FIG. 5 is the opened direction in the flow control device 1 in accordance with the present embodiment.

When the ring-shaped sprocket 8 rotates in a clockwise direction CW (closed direction) from the completely opened state shown in FIG. 5(A) by means of driving the stepping motor 40 to rotate the ring-shaped sprocket 8 through the output shaft 41, the first power transmission gear 46 and the second power transmission gear 48, the rolling element body 9 revolves along the outer wall face 550 of the cylindrical wall part 50 together with the ring-shaped sprocket 8 in the clockwise direction CW as shown in FIG. 5(B). At this time, since the outer teeth 91 of the rolling element body 9 is engaged with the outer teeth 72 of the gear body 7 on the cylindrical wall part 50 side, the rolling element body 9 rotates in the clockwise direction CW when the rolling element body 9 revolves in the clockwise direction CW. As a result, the sheet shaped valve element 6 wound around the body portion 95 of the rolling element body 9 is unwound and extended along the outer wall face 550 of the cylindrical wall 50 and covers and closes the aperture part 55. This is a completely closed state of the aperture part 55 as shown in FIG. 5(B).

When the ring-shaped sprocket 8 rotates in the counter clockwise direction CCW from the completely closed state as shown in FIG. 5(B) by means of driving the stepping motor 40 to rotate the ring-shaped sprocket 8 through the output shaft 41, the first power transmission gear 46 and the second power transmission gear 48, the rolling element body 9 revolves along the outer wall face 550 of the cylindrical wall part 50 together with the ring-shaped sprocket 8 in the counter clockwise direction CCW as shown in FIG. 5(A). At this time, since the outer teeth 91 of the rolling element body 9 are engaged with the outer teeth 72 of the gear body 7, the rolling element body 9 rotates in the counter clockwise direction CCW when the rolling element body 9 revolves in the counter clockwise direction CCW. As a result, the sheet shaped valve element 6 covering along the outer wall face 550 of the cylindrical wall 50 is wound around the body portion 95 of the rolling element body 9 and thus the aperture part 55 is opened to be in the opened state.

Accordingly, in the opened state of the aperture part 55 as shown in FIG. 5(A) in which fluid, e.g., gas flows from the fluid inlet port 22 of the lower case 2 to the fluid outlet port 21, the flow of the fluid can be completely stopped when the rolling element body 9 is fully moved in the clockwise direction CW. Also, an amount that the aperture part 55 is opened can be controlled by controlling the position of the rolling element body 9 in a peripheral direction and thus the flow rate can be controlled.

For example, when the aperture part 55 shown in FIG. 11(A) is gradually closed by the sheet-shaped valve element 6 in the direction as shown by the arrow "P" (closed direction), the flow rate decreases in a nearly linear manner, for example, as shown in FIG. 11(B), from a completely opened state with an opened area of 30 mm$^2$ to a completely closed state with an opened area of 0 mm$^2$. Accordingly, the flow rate of fluid, e.g., gas passing through the aperture part 55 is precisely controlled in correspondence with the opened area.

As described above, in the flow control device 1 according to the present embodiment, the sheet shaped valve element 6 wound around the rolling element body 9 is utilized, and the rolling element body 9 performs a rolling motion along the outer wall face 550, on which the aperture part 55 is formed, in the closed direction to unwind and extend the sheet shaped valve element 6 for covering the aperture part 55. Further, the rolling element body 9 performs in a rolling motion in the opened direction to wind the sheet shaped valve element 6 in the unwound and extended state around the rolling element body 9 for opening the aperture part 55. Therefore, the opening degree of the aperture part 55 by the sheet shaped valve element 6 can be adjusted by means of the angular position of the rolling element body 9. Accordingly, the flow pattern can be arbitrarily adjusted by means of the shape of the aperture part 55 and thus the linear control of the flow rate can be easily attained.

Moreover, since a rubber sheet is used as the sheet shaped valve element 6, the sheet shaped valve element 6 can be in tight contact with the outer wall face 550 by its own elasticity. Therefore, leakage of the fluid, even gas, does not occur. Further, when the rolling element body 9 performs the rolling motion in the closed direction completely, the aperture part 55 is completely covered and closed by the sheet-shaped valve element 6, and the sheet shaped valve element 6 becomes in tight contact along the outer wall face 550 by the fluid pressure. Accordingly, the completely closed state can be easily realized.

Furthermore, since a sliding mechanism is not used for the operation, little wear occurs. Therefore, high precision is not required for the dimension of the mechanical parts and a high degree of reliability can be attained.

In addition, since the rotational motion is utilized for the operation of the rolling element body 9 in a rolling motion, the rotational motion outputted from the stepping motor 40 is merely transmitted to the rolling element body 9 and thus the rotational motion is not required to be converted into linear motion. Therefore, only a simple mechanism is required and energy loss is minimal.

Moreover, the aperture part 55 is formed so as to be extended in the rolling direction of the rolling element body 9. The aperture width is narrow on the smaller amount of the flow rate side (closed direction side) and the aperture width is wide on the larger amount of the flow rate side (open direction side). Accordingly, the opening degree of the aperture part 55, i.e., the flow rate can be controlled with a high degree of precision. In particular, even on the smaller amount of flow rate side, the flow rate can be controlled with a high degree of precision.

Further, the present embodiment is constituted in such a manner that the rolling element body 9 executes a planet motion along the outer wall face 550 of the cylindrical wall part 50 and thus the mechanism for moving the rolling element body 9 along the outer wall face 550 can be simplified. Also, the aperture part 55 is formed so as to extend in the rolling direction of the rolling element body 9, and thus the valve mechanism can be constituted within a narrow space.

Further, the rolling element body 9 is rotatably supported on the ring-shaped sprocket 8 that can be rotated about the cylindrical wall part 50. Therefore, the rolling element body 9 revolves by transmitting the rotational motion outputted from the stepping motor 40 to the rolling element body 9 with a simple constitution. Moreover, the constitution is employed that the internal teeth 85 of the ring-shaped sprocket 8 engage with the second power transmission gear 48 of the valve element drive mechanism 4. Therefore, the entire or most of the mechanism components can be disposed on an inner side of the ring-shaped sprocket 8 and thus the flow control device 1 can be disposed within a narrow space.

In addition, the outer teeth of the rolling element body 9 and the outer teeth 72 formed on the cylindrical wall part 50 side are engaged with each other, and thus the rolling element body 9 rotates with a simple constitution. Moreover, since the rolling element body 9 is urged by the rubber ring 99 toward the cylindrical wall part 50, the revolution and the rotation of the rolling element body 9 can be performed in an interlocked manner, and further, the sheet shaped valve element 6 can be in tight contact contacted with the outer wall face 550.

Embodiment 2

(Appearance and Constitution of Valve Element Drive Mechanism)

FIG. 12 is a plan view of a flow control device in accordance with a second embodiment of the present invention. FIG. 13 is a developed view of respective constitutional elements that are assembled into the flow control device in accordance with the second embodiment. FIG. 14 is an exploded perspective view showing the flow control device in accordance with the second embodiment.

As shown in these drawings, a flow control device 100 according to the present embodiment is used to control flow of LP (liquefied petroleum) gas, town gas, coolant for a refrigerator or an air-conditioner or the like. The flow control device 100 includes a lower case 102 having a cylindrical recessed part 120 provided with a cylindrical fluid outlet port 121 at its bottom portion, a fluid inlet port 122 formed on a peripheral wall of the recessed part 120, and a square-shaped flange part 123 extended on the outer peripheral side from the upper end of the recessed part 120.

An inner case 105 is fit on the recessed part 120 of the lower case 102. The inner case 105 is provided with a peripheral wall part 151 in which the portion facing the fluid inlet port 122 is cut out and a top plate 152 for covering the peripheral wall part 151 at a position lower than the upper end of the peripheral wall part 151. Also, a cut-out part 153 where portions of the peripheral wall part 151 and the top plate 152 are cut out is formed in the inner case 105 on the fluid outlet port 121 side of the lower case 102.

An upper case 103 is covered on the lower case 102, in which the inner case 105 is fitted, under a state that an O-ring 131 is interposed between the upper case 103 and the lower case 102. An outer periphery of the upper case 103 and the flange part 123 of the lower case 2 are fixed to each other with screws or the like. A cylindrical part 130 for disposing a rotor etc. of the stepping motor 140 is protruded in the upper case 103.

In this embodiment, the valve element drive mechanism 104 of the flow control device 100 includes a stepping motor 140 and a first lever 108 provided with outer teeth 181 which are engaged with a pinion 142 fixed on an output shaft 141 of the stepping motor 140. A rotor 143, a leaf spring 144 or the like of the stepping motor 140 are arranged within a cylindrical part 130 of the upper case 103 and motor coils 146 and a motor cover 147 constituting a stator 145 of the stepping motor 140 are arranged on an outer peripheral face of the cylindrical part 130.

Also, an output shaft 141 of the stepping motor 140 is rotatably supported by means of its tip end supported by a bearing hole 154 formed on the top plate 152 of the inner case 105 rotatably. The bearing hole 154 is formed near the cut-out portion 153 in the top plate 152. Outer teeth 181 of the first lever 108 are disposed in the cut-out portion 153 and are engaged with the pinion 142 of the output shaft 141.

The first lever 108 is provided with a cylindrical part 182, an extended part 183 having the outer teeth 181 which are formed so as to be extended on the outer periphery side from the cylindrical part 182 in a sector shape, and an arm part 184 extending on the outer periphery side from the extended part 183. A shaft hole 185 is formed on a tip end of the arm part 184. The arm part 184 is arranged under the top plate 152 of the inner case 105 while the outer teeth 181 of the first lever 108 are engaged with the pinion 142 of the output shaft 141.

(Constitution of Valve Mechanism)

FIG. 15(A) is a plan view showing an opened state in the flow control device to which the present invention is applied and FIG. 15(B) is a plan view showing a closed state in the flow control device. FIG. 16 is an explanatory view showing a relationship between the magnitudes of the detent torque and the output torque of the stepping motor and the torque of a return spring in the flow control device to which the present invention is applied.

In FIGS. 13 and 14, the flow control device 100 to which the present invention is applied is provided with a cylindrical wall part 124 formed to be protruded upward from the fluid outlet port 121 on the recessed part 120 of the lower case 102 covered with the upper case 103. An aperture part 126 formed so as to be extended in a peripheral direction is opened on an outer wall face 125 of the cylindrical wall part 124. The aperture part 126 is in communication with the fluid outlet port 121 through the inside of the cylindrical wall part 124.

In this embodiment, the aperture part 126 is formed in a trapezoid shape and formed in such a manner that an aperture width is wider along the closed direction of the sheet shaped valve element 106 (direction shown by the arrow CW in FIG. 14), that is, wider on the smaller amount of the flow rate side and narrower along the opened direction (direction shown by the arrow CCW in FIG. 14), that is, narrower on the larger amount of the flow rate side. In other words, the aperture part 126 is formed contrary to the aperture part 55 described in the first embodiment.

A groove 127, into which one end of the sheet shaped valve element 106 described later is inserted and fixed, is formed so as to be extended downward from the upper face side on the side face of the cylindrical wall part 124.

The cylindrical wall part 124 is formed in such a manner that its upper portion is closed and a protrusion 128 for attaching a gear body 107 is formed upward on the upper face portion of the cylindrical wall part 124.

The gear body 107 is provided with a cylindrical fixed part 171 that is fixed to the upper portion of the cylindrical wall part 124 of the lower case 102 and outer teeth 172 are formed on the lower and outer portion of the fixed part 171. A cylindrical part 182 of the first lever 108 is fitted on the fixed part 171 to support the first lever 108 rotatably.

In this embodiment, a reset spring 200 (home position reset mechanism) that is a torsion spring is fitted between the cylindrical part 182 of the first lever 108 and the outer teeth 172 of the fixed part 171. One end 201 of the reset spring 200 is fixed to the first lever 108 and the other end 202 is fixed to the gear body 107 to urge the first lever 108 in a clockwise direction CW.

The magnitudes of the detent torque (at the time of no energization), output torque (at the time of energization) of the stepping motor 140 and the torque of the reset spring 200 are set in such a manner that the torque L3 of the reset spring 200 is larger than the detent torque L1 of the stepping motor 140 at all times and smaller than the output torque L2 at all times as shown by the dotted line L1 and the solid lines L2 and L3 in FIG. 16.

Also, a second lever 110 (movable body), which is rotatably supported on the cylindrical wall part 124 along its outer periphery, is arranged on the cylindrical wall part 124. The second lever 110 is provided with a circular ring part 111 to be fitted on the cylindrical wall part 124 and an arm part 112 extended outside from the circular ring part 111. An outer edge part 112a in the clockwise direction CW of the arm part 112 abuts against a protruded part 102a formed on the bottom face of the lower case 102 when the second lever 110 rotates in the clockwise direction CW to restrict further rotation of the second lever 110. An outer edge part 112b in the counter clockwise direction CCW of the arm part 112 abuts against a protruded part 102b (see FIG. 15(B)) formed on the bottom face of the lower case 102 when the second lever 110 rotates in the counter clockwise direction CCW to restrict further rotation of the second lever 110.

Also, the second lever 110 is provided with a rotation center shaft 113 extending upward from the tip end of the arm part 112. The upper end part 114 of the rotation center shaft 113 is inserted into the shaft hole 185 formed on the arm part 184 of the first lever 108.

A rolling element body 109 is rotatably mounted on the rotation center shaft 113. The rolling element body 109 is a cylindrical body having a shaft hole 190 into which the rotation center shaft 113 is fitted and outer teeth 191 are formed on the circumference face on the upper end side. The outer teeth 191 of the rolling element body 109 are engaged with the outer teeth 172 of the gear body 107 while the rolling element body 109 is arranged within the recessed part 120 of the lower case 102 along with the second lever 110.

A trunk part 192 around which the sheet shaped valve element 106 is wound is formed in the rolling element body 109 at a lower portion of the outer teeth 191. A deep groove 193 into which one end of the sheet shaped valve element 106 is inserted and fixed is opened on the under face of the trunk part 192.

The sheet shaped valve element 106 is made of rubber and formed in a band shape. A first round bar-shaped connecting part 161 which is inserted and fixed to the groove 127 formed on the side face of the cylindrical wall part 124 and a second round bar-shaped connecting part 162 which is inserted and fixed to the groove 193 formed on the rolling element body 109 are formed on both end portions of the sheet shaped valve element 106.

The sheet shaped valve element 106 is wound around the trunk portion 192 of the rolling element body 109 in an opened state as shown in FIG. 15(A). In a closed state, the sheet shaped valve element 106 is unwound and extended along the outer wall face 125 of the cylindrical wall part 124 in accordance with the rolling motion of the rolling element body 109 in the clockwise direction CW as shown in FIG. 15(B) to cover and close the aperture part 126 (see FIG. 14).

(Operation and Effect)

FIG. 17(A) is an explanatory view of the aperture part used in the flow control device 100 to which the present invention is applied and FIG. 17(B) is a graph showing a relationship between an angular position of the rolling element body with respect to the aperture part and an opened area of the aperture part.

In the flow control device 100 according to the present embodiment, when the sheet shaped valve element 106 is wound around the trunk part 192 of the rolling element body 109 in the state that the rolling element body 109 is moved in the counter clockwise direction CCW as shown in FIG. 13 and FIG. 15(A), the aperture part 126 formed on the cylindrical wall part 126 is in a completely opened state. Accordingly, the counter clockwise direction CCW in FIG. 15(A) is the opened direction in the flow control device 100 in accordance with the present embodiment.

When the second lever 110 rotates in a clockwise direction CW (closed direction) from the completely opened state by means of driving the stepping motor 140 to rotate the second lever 110 through the pinion 142 of the output shaft 141 and the first lever 108, the rolling element body 109 revolves along the outer wall face 125 of the cylindrical wall part 124 together with the second lever 110 in the clockwise direction CW as shown in FIG. 15(B). At this time, since the outer teeth 191 of the rolling element body 109 are engaged with the outer teeth 172 of the gear body 107 on the cylindrical wall part 124 side, the rolling element body 109 rotates in the clockwise direction CW when the rolling element body 109 revolves in the clockwise direction CW. As a result, the sheet shaped valve element 106 wound around the trunk part 192 of the rolling element body 109 is unwound along the outer wall face 125 of the cylindrical wall part 124 and covers and closes the aperture part 126. This is a completely closed state as shown in FIG. 15(B).

When the second lever 110 rotates in the counter clockwise direction CCW from the completely closed state by means of driving the stepping motor 140 to rotate the second lever 110 through the pinion 142 of the output shaft 141 and the first lever 108, the rolling element body 109 revolves along the outer wall face 125 of the cylindrical wall part 124 together with the second lever 110 in the counter clockwise direction CCW as shown in FIG. 15(A). At this time, since the outer teeth 191 of the rolling element body 109 is engaged with the outer teeth 172 of the gear body 107, the rolling element body 109 rotates in the counter clockwise direction CCW when the rolling element body 109 revolves in the counter clockwise direction CCW. As a result, the sheet shaped valve element 106 extended along the outer wall face 125 of the cylindrical wall part 124 is wound around the trunk part 192 of the rolling element body 109 and thus the aperture part 126 is opened to be in an opened state.

Accordingly, in an opened state of the aperture part 126 as shown in FIG. 15(A) when the fluid, e.g., gas is flown from the fluid inlet port 122 of the lower case 102 to the fluid outlet port 121, the flow of the fluid can be completely stopped when the rolling element body 109 is fully moved in the clockwise direction CW. Also, an opened degree of the aperture part 126 can be controlled by controlling the angular position of the rolling element body 109 in a peripheral direction and thus the flow rate can be controlled.

For example, when the aperture part 126 shown in FIG. 17(A) is opened in the direction as shown by the arrow P1 (opened direction) from the state that the aperture part 126 is closed by the sheet shaped valve element 106, the flow rate increases linearly, for example, as shown in FIG. 17(B), from the completely closed state in which the opened area is 0 mm$^2$ to the completely opened state in which the opened area is 30 mm$^2$. Accordingly, the flow rate of the gas passing through the aperture part 126 is controlled in correspondence with the opened area with a high degree of precision.

In the flow control device 100 in accordance with the present embodiment, the first lever 108 is urged by a reset spring 200 in the clockwise direction CW with respect to the gear body 107. Accordingly, at the time of stopping energization to the stepping motor 140, the first lever 108 rotates in the clockwise direction CW by the urging force of the reset spring 200. Therefore, the rolling element body 109 automatically performs a rolling motion together with the second lever 110 in the clockwise direction CW to cause the sheet shaped valve element 106 to close the aperture part 126 completely.

When the sheet shaped valve element 106 is opened from the completely closed state, the first lever 108 rotates in the counter clockwise direction CCW by means of the stepping motor 140 and thus the reset spring 200 is twisted in the counter clockwise direction CCW.

Consequently, when the power fed to the stepping motor 140 stops in the case that the sheet shaped valve element 106 is positioned in the opened state of the aperture part 126, the twisted reset spring 200 returns in the clockwise direction CW. Then, the first lever 108 rotates in the clockwise direction CW by the urging force of the reset spring 200 and the rolling element body 109 performs a rolling motion together with the second lever 110 in the clockwise direction CW to lead in a state that the sheet shaped valve element 106 closes the aperture part 126 completely. Therefore, when power fed to the stepping motor 140 stops, the supply of the fluid to the downstream side can be stopped rapidly.

In order to perform the smooth return to the home position of the sheet shaped valve element 106 by the reset spring 200, it is preferable to reduce the detent torque of the stepping motor 140 by setting the gap between the field magnetic pole and the magnet face of the rotor 143 to be larger than that in a common motor, for example, larger than 2 mm. Also, it is preferable to set the reduction gear ratio between the stepping motor 140 and the first lever 108 to be smaller than usual, for example, not more than 1/10.

As described above, in the flow control device 100 according to the present embodiment, the sheet shaped valve element 6 wound around the rolling element body 109 is utilized, and the rolling element body 109 performs the rolling motion in the closed direction along the outer wall face 125 on which the aperture part 126 is formed to unwind and extend the sheet shaped valve element 106 for covering the aperture part 126. Further, the rolling element body 109 performs the rolling motion in the opened direction to wind the sheet shaped valve element 106 in the unwound and extended state around the rolling element body 109 for opening the aperture part 126. Therefore, the opening degree of the aperture part 126 by the sheet shaped valve element 106 can be adjusted by means of the position of the rolling element body 109. Accordingly, the flow pattern can be arbitrarily adjusted by means of the shape of the aperture part 126 and thus the linear control of the flow rate can be easily attained.

Moreover, since a rubber sheet is used as the sheet shaped valve element 106, the sheet shaped valve element 106 can be in tight contact with the outer wall face 125 by its own elasticity. Therefore, leakage of the fluid or the gas does not occur. Further, when the rolling element body 109 performs the rolling motion in the closed direction completely, the aperture part 126 is completely covered and closed by the sheet shaped valve element 106, and the sheet shaped valve element 106 becomes in tight contact state along the outer wall face 125 by the fluid pressure. Accordingly, the completely closed state can be easily realized.

Furthermore, since a sliding mechanism is not adopted for operation, little wear may occur. Therefore, a high degree of precision is not required for the dimensions of the mechanical parts and a high degree of reliability can be attained.

In addition, since the rotational motion is utilized for the operation of the rolling element body 109 in the rolling motion, the rotational motion outputted from the stepping motor 140 is merely transmitted to the rolling element body 109 and thus the rotational motion is not required to be converted into linear motion. Therefore, only a simple mechanism is needed and energy loss is reduced.

The aperture part 126 in this embodiment is formed in such a manner that its aperture width is wide on the smaller flow rate side (closed direction side) and narrow on the larger flow rate side (opened direction side), which is different from the above-mentioned first embodiment. Accordingly, this embodiment is advantageous in that the flow rate on the larger flow rate side can be controlled with a high degree of precision.

Further, the rolling element body 109 executes the planet motion along the outer wall face 125 of the cylindrical wall part 124 and thus the mechanism for moving the rolling element body 109 along the outer wall face 125 can be simplified. Also, even when the aperture part 126 is formed so as to extend in the rolling direction of the rolling element body 109, the valve mechanism can be disposed within a narrow space.

Further, the rolling element body 109 is rotatably supported on the second lever 110 rotatable about the cylindrical wall part 124 and the rotational motion outputted from the stepping motor 140 is transmitted to the second lever 110 through the first lever 108. Therefore, the rolling element body 109 revolves with a simple constitution.

In addition, this embodiment is constituted in such a manner that the outer teeth 191 of the rolling element body 109 and the outer teeth 172 formed on the cylindrical wall part 124 side are engaged with each other. Therefore, the rolling element body 109 rotates with a simple constitution.

In addition, this embodiment is provided with the reset spring 200 for returning the sheet shaped valve element 106 to the completely closed position (home position) in which the aperture part 126 is completely covered and closed. Therefore, the fluid supply to the downstream side can be rapidly stopped when the energization to the valve element drive mechanism 104 stops. Consequently, the fluid flow can stop with a simple constitution without using a shut-off valve such as a solenoid valve at the time of any abnormality.

In order to obtain a large amount of fluid supply rapidly, it is preferable to attach the reset spring so as to move the sheet shaped valve element 106 in the returning direction to the completely opened position of the aperture part 126.

Other Embodiments

The above-mentioned first and second embodiments may be modified as follows. The modification of the first embodiment is explained as an example.

In the above-mentioned embodiments, the aperture part 55 is formed in the trapezoid shape as shown in FIG. 6(A) or FIG. 11(A) in order to control the flow rate of the fluid or the gas to vary linearly. However, the shape of the aperture part 55 or 126 is not limited in the trapezoid shape, but may be modified in a shape having different opening widths in the rolling direction or may be modified depending on the flow pattern to be expected.

Also, the above-mentioned embodiment is constituted in such a manner that the aperture part 55 is formed on the cylindrical wall part 50 and the rolling element body 9 performs the rolling motion along the outer wall face 550. However, the outer wall face 550 on which the aperture part 55 is formed may be formed in a flat face or a curved face other than the circular face.

The above-mentioned embodiment uses a rubber sheet as the sheet shaped valve element 6. However, the sheet shaped valve element 6 is brought into a tight contact state along the outer wall face 550 by means of the fluid pressure under the closed state. Therefore, instead of such a rubber sheet, a resin sheet, a metal sheet, or a composite material sheet made of various kinds of composite materials may be used in accordance with the type of fluid or ambient temperature.

In the first embodiment, the rolling element body 9 performs a sun-and-planet motion by using the planet gear in order that the rolling element body 9 executes the rolling motion surely. Also, the first lever 108 and the second lever 110 are used in the second embodiment. However, a protrusion may be provided on the rolling element body 9 and guided by a grooved cam in a cycloid curved shape to move the rolling element body 9. Also, a rolling mechanism driven by friction may be employed without the planet gear.

Gas and liquid may be used as the fluid for the controlled object of flow.

As described above, in the flow control device according to the present invention, the sheet shaped valve element is extended and developed so as to cover and close the aperture part and also moved to the state in which the aperture part is opened, and thus the opening degree of the aperture part can be adjusted by the sheet shaped valve element. Consequently, the flow pattern can be arbitrarily adjusted by changing the shape of the aperture part, and thus the nearly linear control of the flow rate can be easily attained. Also, the aperture part can be completely covered and closed with the sheet shaped valve element and the sheet shaped valve element is brought into tight contact with the wall face by fluid pressure. Thus, the completely closed state can be easily realized. Further, the valve element does not require a sliding mechanism. Therefore, little wear may occur, high precision is not required for the dimensions of the mechanical parts and a nigh degree of reliability can be obtained.

Also, in the case that the sheet shaped valve element is constituted so as to be extended to cover the aperture part by the rolling motion of the rolling element body in the closed direction from the state in which the sheet shaped valve element is wound around the rolling element body, and further to be wound around the rolling element body to open the aperture part by the rolling motion of the rolling element body in the open direction, the opening degree of the aperture part by the sheet shaped valve element can be adjusted in accordance with the position of the rolling element body. Consequently, since an arbitrary flow pattern is utilized by means of changing the shape of the aperture part, the nearly linear control of the flow rate can be easily performed. Also, when the rolling element body performs the rolling motion in the closed direction completely, the aperture part can be completely covered and closed with the sheet shaped valve element and the sheet shaped valve element is brought into tight contact with the wall face by the fluid pressure. Therefore, the completely closed state can be easily realized. Further, the sheet shaped valve element does not operate so as to slide. Therefore, little wear may occur, high precision is not required for the dimension of the mechanical parts and a high degree of reliability can be obtained. In addition, since the rotational motion is employed to perform the rolling motion of the rolling element body, the rotational motion outputted from the motor is only transmitted to the rolling element body. Therefore, the rotational motion is not required to be converted into linear motion and thus energy loss is little because friction loss is reduced. Moreover, electric power can be saved and control can be performed at high speeds.

While the description above refers to particular embodiments of the invention, it will be understood that many modifications may be made without departing from the spirit thereof. The accompanying claims are intended to cover such modifications as would fall within the true scope and spirit of the present invention.

The disclosed embodiments are therefore to be considered in all respects as illustrative and not restrictive. The scope of the invention being indicated by the appended claims, rather than the foregoing description, and all changes which come within the meaning and range of equivalency of the claims are therefore intended to be embraced therein.

What is claimed is:

1. A flow control device comprising:
   a wall part partitioning an upstream side and a downstream side of a flow passage for fluid;
   an aperture part formed on the wall part;
   a sheet shaped valve element which changes from closed state in which the sheet shaped valve element extends along the wall part to cover the aperture part to an open state in which the aperture part is opened;
   a valve element drive mechanism for moving the sheet shaped valve element; and
   a rolling element body provided in the valve element drive mechanism that performs a rolling motion along a wall face of the wall part, wherein the sheet shaped valve element is extended along the wall part to cover the aperture part by the rolling motion of the rolling element body in the closed direction and changed to a state in which the aperture part is opened from the extended state by the rolling motion of the rolling element body in the opened direction, and
   wherein the wall part is a cylindrical wall part having an inner side formed downstream and the rolling element body performs a planet motion along an outer wall face of the cylindrical wall part.

2. The flow control device according to claim 1, wherein the valve element drive mechanism adjusts an opening degree of the aperture part by the sheet shaped valve element.

3. The flow control device according to claim 1, wherein the sheet shaped valve element extends along the wall part to cover the aperture part by the rolling motion of the rolling element body in the closed direction from a state in which the sheet shaped valve element is wound around the rolling element body and to be wound around the rolling element body to open the aperture part by the rolling motion of the rolling element body in the opened direction from the extended state of the sheet shaped valve element.

4. The flow control device according to claim 1, wherein the aperture part is formed in a shape extended in a rolling direction of the rolling element body.

5. The flow control device according to claim 4, wherein the shape of the aperture part is formed so as to have different opening widths in the rolling direction of the rolling element body.

6. The flow control device according to claim 5, wherein the aperture part is formed having the aperture opening width is narrow on one side and wide on the other side.

7. The flow control device according to claim 1, further comprising a movable body provided in the valve element drive mechanism and rotates about the cylindrical wall part while rotatably supporting the rolling element body, wherein the movable body is rotated about the cylindrical wall part moving the rolling element body along the outer wall face of the cylindrical wall part.

8. The flow control device according to claim 1, wherein the sheet shaped valve element is an elastic sheet.

9. The flow control device according to claim 1, wherein the fluid is gas or liquid.

10. A flow control device comprising:
a wall part partitioning an upstream side and a downstream side of a flow passage for fluid;
an aperture part formed on the wall part;
a sheet shaped valve element which changes from closed state in which the sheet shaped valve element extends along the wall part to cover the aperture part to an open state in which the aperture part is opened;
a valve element drive mechanism for moving the sheet shaped valve element; and
a rolling element body provided in the valve element drive mechanism that performs a rolling motion along a wall face of the wall part, wherein the sheet shaped valve element is extended along the wall part to cover the aperture part by the rolling motion of the rolling element body in the closed direction and changed to a state in which the aperture part is opened from the extended state by the rolling motion of the rolling element body in the opened direction, and
wherein a first set of outer teeth are formed in the rolling element body and a second set of outer teeth engaged with the first set of outer teeth for rotating the rolling element body are formed on the wall face side.

11. A flow control device comprising:
a wall part partitioning an upstream side and a downstream side of a flow passage for fluid;
an aperture part formed on the wall part;
a sheet shaped valve element which changes from closed state in which the sheet shaped valve element extends along the wall part to cover the aperture part to an open state in which the aperture part is opened;
a valve element drive mechanism for moving the sheet shaped valve element; and
a home position reset mechanism for returning the sheet shaped valve element toward a home position where the aperture part is completely opened or toward a home position where the aperture part is completely closed when energization for a motor of the valve element drive mechanism stops,
wherein the valve element drive mechanism drives the sheet shaped valve element from the home position in a specified direction against a force which the home position reset mechanism exerts on the sheet shaped valve element, and
wherein a gap between a field magnetic pole and a magnet of the motor is set to be not less than 2 mm.

12. The flow control device according to claim 11, wherein the sheet shaped valve element is an elastic sheet.

13. The flow control device according to claim 11, wherein the fluid is gas or liquid.

14. A flow control device comprising:
a wall part partitioning an upstream side and a downstream side of a flow passage for fluid;
an aperture part formed on the wall part;
a sheet shaped valve element which changes from closed state in which the sheet shaped valve element extends along the wall part to cover the aperture part to an open state in which the aperture part is opened;
a valve element drive mechanism for moving the sheet shaped valve element; and
a home position reset mechanism for returning the sheet shaped valve element toward a home position where the aperture part is completely opened or toward a home position where the aperture part is completely closed when energization for a motor of the valve element drive mechanism stops,
wherein the valve element drive mechanism drives the sheet shaped valve element from the home position in a specified direction against a force which the home position reset mechanism exerts on the sheet shaped valve element, and
wherein a reduction gear ratio in the valve element drive mechanism is set to be not more than $1/10$.

* * * * *